United States Patent
Morito

(10) Patent No.: US 11,555,715 B2
(45) Date of Patent: Jan. 17, 2023

(54) RESOLVER SIGNAL PROCESSING DEVICE, DRIVE APPARATUS, RESOLVER SIGNAL PROCESSING METHOD, AND PROGRAM

(71) Applicant: TOSHIBA MITSUBISHI-ELECTRIC INDUSTRIAL SYSTEMS CORPORATION, Chuo-ku (JP)

(72) Inventor: Chikara Morito, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 269 days.

(21) Appl. No.: 17/055,855

(22) PCT Filed: Mar. 1, 2019

(86) PCT No.: PCT/JP2019/008081
§ 371 (c)(1),
(2) Date: Nov. 16, 2020

(87) PCT Pub. No.: WO2020/178896
PCT Pub. Date: Sep. 10, 2020

(65) Prior Publication Data
US 2021/0223065 A1    Jul. 22, 2021

(51) Int. Cl.
*H02M 3/335*    (2006.01)
*G01D 5/244*    (2006.01)
*H02P 27/06*    (2006.01)

(52) U.S. Cl.
CPC .............. *G01D 5/244* (2013.01); *H02P 27/06* (2013.01)

(58) Field of Classification Search
CPC .......... G01D 5/244; G01D 5/204; H02P 27/06
See application file for complete search history.

(56) References Cited

U.S. PATENT DOCUMENTS

| | | | | |
|---|---|---|---|---|
| 4,348,627 A | * | 9/1982 | Fulton | ..................... H02P 23/08 |
| | | | | 318/807 |
| 5,144,216 A | * | 9/1992 | De Doncker | ........... H02P 21/10 |
| | | | | 318/807 |
| 9,054,630 B2 | * | 6/2015 | Kobayashi | ............ H02P 21/141 |

FOREIGN PATENT DOCUMENTS

| | | |
|---|---|---|
| JP | 2006-23164 A | 1/2006 |
| JP | 2009-145273 A | 7/2009 |
| JP | 2012-145488 A | 8/2012 |
| JP | 2013-221878 A | 10/2013 |

(Continued)

OTHER PUBLICATIONS

International Search Report dated Mar. 26, 2019 in PCT/JP2019/008081 filed on Mar. 1, 2019, 2 pages.

*Primary Examiner* — Muhammad S Islam
(74) *Attorney, Agent, or Firm* — Oblon, McClelland, Maier & Neustadt, L.L.P.

(57) ABSTRACT

A resolver signal processing device includes an output signal state detection unit and a disconnection detection unit. The output signal state detection unit calculates a sum of squares of a signal with a first phase and a signal with a second phase which are output signals of a two-phase output type resolver based on the output signals. The disconnection identification unit outputs information representing a disconnection state of any of a first signal system which supplies an excitation signal of the resolver and a second signal system of the output signals based on a size of a variation range in which the sum of squares periodically changes.

7 Claims, 16 Drawing Sheets

(56) References Cited

FOREIGN PATENT DOCUMENTS

| JP | 2018-40660 A | 3/2018 |
|----|--------------|--------|
| WO | WO 2016/157643 A1 | 10/2016 |

* cited by examiner

RESOLVER SIGNAL PROCESSING DEVICE, DRIVE APPARATUS, RESOLVER SIGNAL PROCESSING METHOD, AND PROGRAM

TECHNICAL FIELD

Embodiments of the present invention relate to a resolver signal processing device, a drive apparatus, a resolver signal processing method, and a program.

BACKGROUND ART

A resolver signal processing device extracts a rotation angle of a motor connected to a resolver on the basis of a resolver output. However, correct phase information cannot be detected when an abnormal state such as disconnection of the resolver from the resolver signal processing device occurs. In a case where the resolver signal processing device is applied to a system that requires phase information detection accuracy, detection of occurrence of disconnection without omission is required, which is not easy.

CITATION LIST

Patent Literature

[Patent Literature 1]
Japanese Unexamined Patent Application, First Publication No. 2018-40660

SUMMARY OF INVENTION

Technical Problem

An object of the present invention is to provide a resolver signal processing device, a drive apparatus, a resolver signal processing method, and a program for detecting a disconnection state of any of a first signal system that supplies an excitation signal to a two-phase output type resolver and a second signal system that receives output signals from the resolver.

Solution to Problem

A resolver signal processing device of an aspect of embodiments includes an output signal state detection unit and a disconnection detection unit. The output signal state detection unit calculates a sum of squares of a signal with phase A and a signal with phase B which are output signals of a two-phase output type resolver on the basis of the output signals. The disconnection identification unit outputs information representing a disconnection state of any of a first signal system which supplies an excitation signal of the resolver and a second signal system of the output signals on the basis of a size of a variation range in which the sum of squares periodically changes.

DESCRIPTION OF EMBODIMENTS

Hereinafter, a resolver signal processing device, a drive apparatus, a resolver signal processing method, and a program of embodiments will be described with reference to the drawings. In the following description, the same components having the same or similar functions are denoted by the same signs. In addition, redundant description of such components may be omitted.

A two-phase excitation two-phase output type is exemplified as a resolver of an embodiment. A two-phase output type resolver outputs a signal with two phases A and B which have been amplitude-modulated with a phase difference of about 90 degrees. For example, the aforementioned signal with two phases may have a sine wave and a cosine wave having amplitudes changing with a phase $\theta 0$. A two-phase excitation type resolver is provided with an excitation signal with phases A and B which have been amplitude-modulated with a phase difference of about 90 degrees. In addition to the two-phase excitation two-phase output type resolver, there are a one-phase excitation two-phase output type, a two-phase excitation one-phase output type, and the like.

Meanwhile, "electrically connected" may be simply represented as "connected" in the following description. In a case where values such as speeds and phases of comparison targets are the same values or similar values, they may be simply regarded as "the same."

First Embodiment

Figure 1:
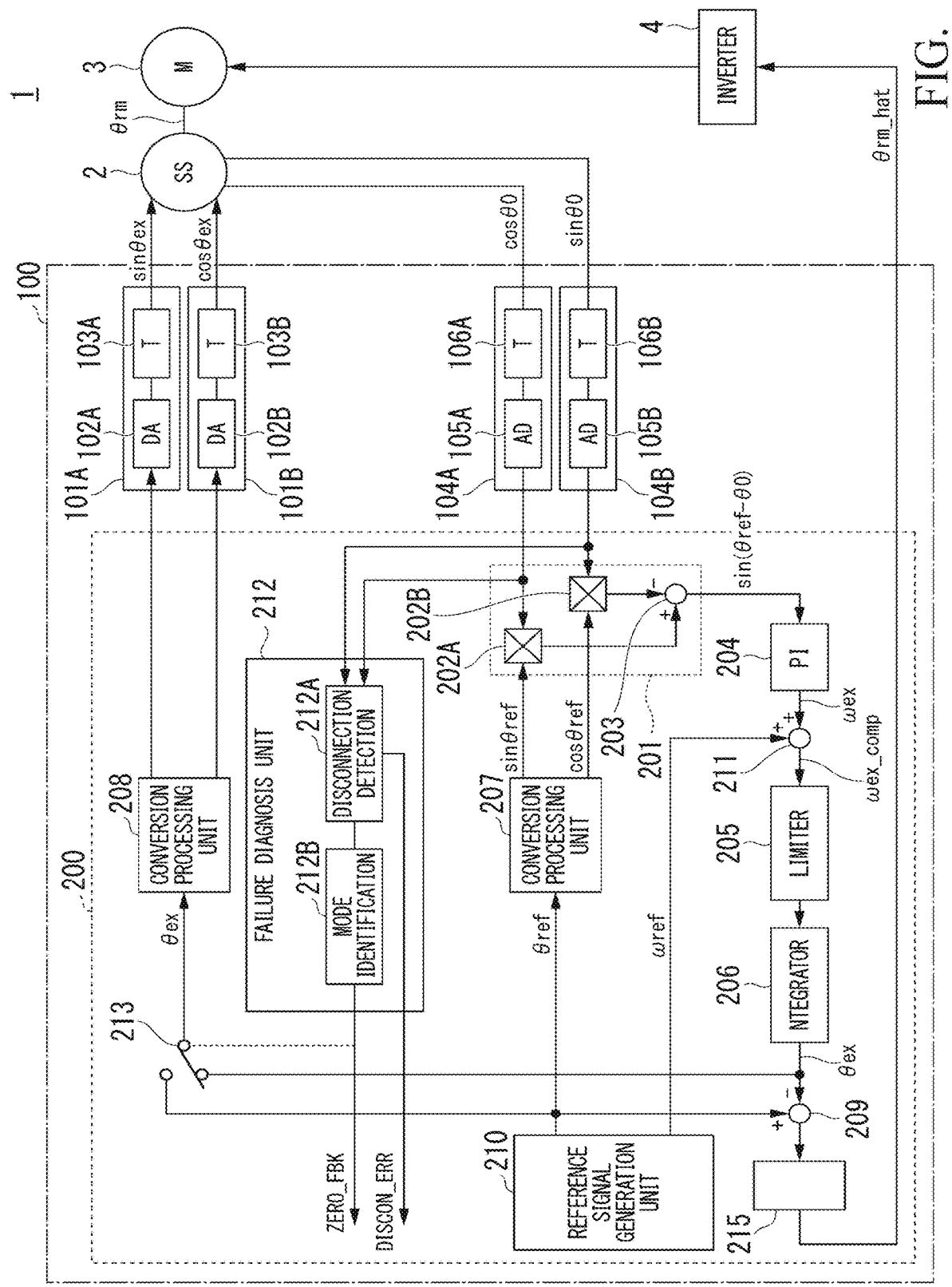
FIG. 1 is a configuration diagram of a drive apparatus including a resolver signal processing device according to an embodiment.

FIG. 1 is a configuration diagram of a drive apparatus 1 including a resolver signal processing device 100 according to an embodiment.

The drive apparatus 1 includes, for example, a resolver 2 (denoted by SS in the figure), a motor 3 (denoted by M in the figure), an inverter 4, and the resolver signal processing device 100.

The shaft of the resolver 2 is connected to the output shaft of the motor 3 and rotates in connection with rotation of the output shaft of the motor 3. For example, the motor 3 is driven by the inverter 4.

The resolver signal processing device 100 is connected to the resolver 2, supplies a two-phase excitation signal to the resolver 2, and receives a two-phase signal output from the resolver 2.

Here, the resolver 2 will be described with reference to FIG. 2A to FIG. 2C.

Figure 2A:
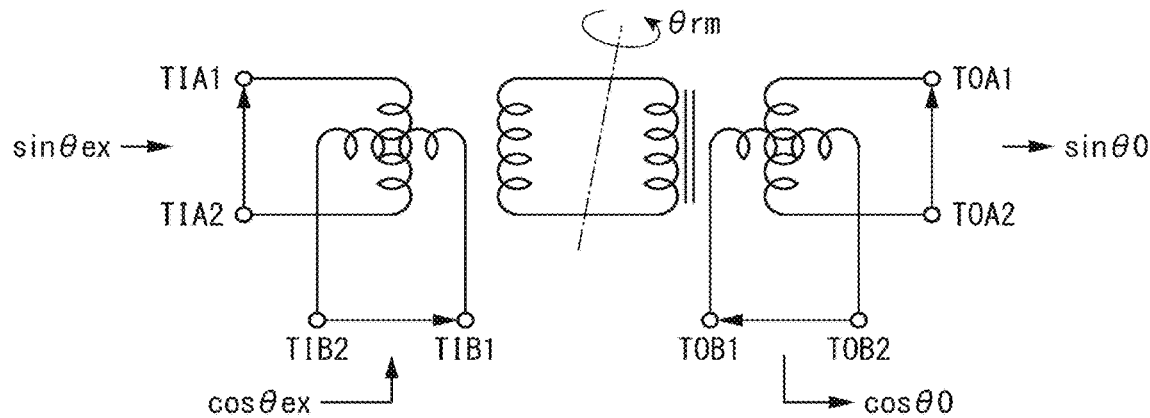
FIG. 2A is a configuration diagram of a resolver of an embodiment.
Figure 2B:
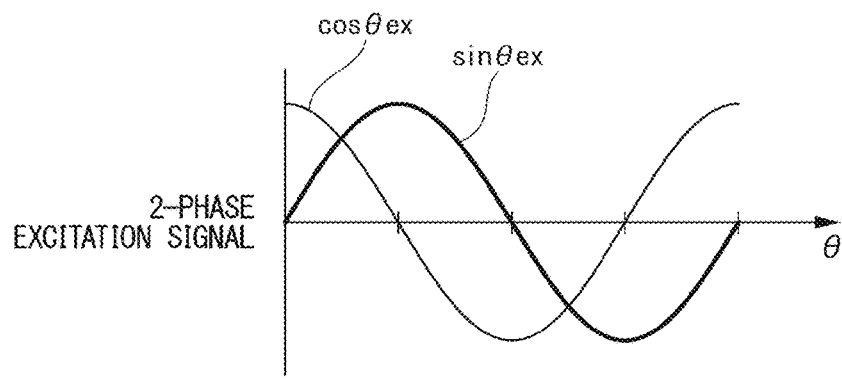
FIG. 2B is a diagram for describing a two-phase excitation signal of the resolver of an embodiment.
Figure 2C:
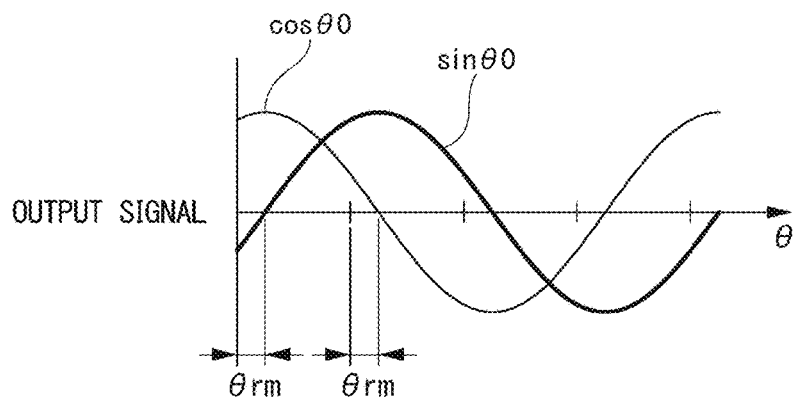
FIG. 2C is a diagram for describing a two-phase output signal of the resolver of an embodiment.

FIG. 2A is a configuration diagram of the resolver 2 of an embodiment. FIG. 2B is a diagram for describing a two-phase excitation signal of the resolver 2 of an embodiment. FIG. 2C is a diagram for describing a two-phase output signal of the resolver 2 of an embodiment.

For example, the resolver 2 is excited by a two-phase excitation signal with an excitation phase $\theta ex$. The resolver 2 detects a mechanical angle phase $\theta rm$ of the output shaft of the motor 3. The resolver 2 outputs a two-phase signal based on a phase $\theta 0$ related to the excitation phase $\theta ex$ of the two-phase excitation signal and the mechanical angle phase $\theta rm$.

A signal represented as $\sin \theta ex$ and $\cos \theta ex$ illustrated in the figures is an example of the two-phase excitation signal. A signal represented as $\sin \theta 0$ and $\cos \theta 0$ is an example of the two-phase output signal. For example, both the two-phase excitation signal and the two-phase output signal are continuous signals. The mechanical angle phase $\theta rm$, the excitation phase $\theta ex$ of the two-phase excitation signal and the phase $\theta 0$ have a relationship represented by expression (1).

$$\theta 0 = \theta rm + \theta ex \tag{1}$$

$$\theta ex = \int \omega ex(t) dt \tag{2}$$

The excitation phase $\theta ex$ in the above expression (1) is derived on the basis of an excitation angular frequency $\omega ex(t)$ as represented by expression (2). The excitation angular frequency $\omega ex(t)$ changes depending on a time t. The excitation phase $\theta ex$ is derived by integration of the excitation angular frequency $\omega ex(t)$ with respect to time.

Referring back to FIG. 1, description of the resolver signal processing device 100 will continue.

The resolver signal processing device 100 detects the phase of the resolver 2, that is, the mechanical angle phase $\theta rm$ of the output shaft of the motor 3, on the basis of the two-phase signal and supplies a mechanical angle phase estimate $\theta rm\_hat$ that is an estimate of the mechanical angle phase $\theta rm$ to the inverter 4. Hereinafter, the phase of the resolver 2 and an estimate thereof will be simply referred to as the mechanical angle phase $\theta rm$ and the mechanical angle phase estimate $\theta rm\_hat$.

Accordingly, the inverter 4 can drive the motor 3 according to position control based on the mechanical angle phase estimate θrm_hat by using the mechanical angle phase estimate θrm_hat as feedback information instead of the mechanical angle phase θrm.

The resolver signal processing device 100 will be described.

The resolver signal processing device 100 includes, for example, output buffer circuits 101A and 101B, input buffer circuits 104A and 104B, and a resolver signal processing unit 200.

Inputs of the output buffer circuits 101A and 101B are connected to the resolver signal processing unit 200. Outputs of the output buffer circuits 101A and 101B are connected to an excitation side of the resolver 2. The output buffer circuits 101A and 101B supply, to the resolver 2, a two-phase signal based on an excitation signal supplied from the resolver signal processing unit 200 which will be described later.

For example, the output buffer circuit 101A includes a digital-analog converter 102A which is not illustrated (hereinafter referred to as a DA converter denoted by DA in the figure) for outputting phase A, a buffer for signal amplification which is not illustrated, a transformer 103A for insulation (denoted by T in the figure), and the like. The DA converter 102A, the buffer for signal amplification and the transformer 103A are connected in the order in which they are listed. The transformer 103A electrically insulates the resolver signal processing device 100 from the resolver 2. Description of the transformer below is omitted on the assumption that a transformation ratio of the transformer 103A is 1. Likewise, the output buffer circuit 101B also includes a digital-analog converter 102B for outputting phase B which is not illustrated, a buffer for signal amplification which is not illustrated, a transformer 103B, and the like. The DA converter 102B may be the same as the DA converter 102A. The transformer 103B may be the same as the transformer 103A. The DA converter 102B and the buffer for signal amplification and the transformer 103B are connected in the order in which they are listed. Meanwhile, in a case where the transformation ratio of the transformers 103A and 103B is not 1, the output buffer circuits 101A and 101B may appropriately correct amplitudes of signals on the basis of the transformation ratio of the transformers 103A and 103B.

Inputs of the input buffer circuits 104A and 104B are connected to the output side of the resolver 2. Outputs of the input buffer circuits 104A and 104B are connected to the resolver signal processing unit 200. The input buffer circuits 104A and 104B receive a two-phase signal based on the phase θ0 from the resolver 2 and supply the two-phase signal to the resolver signal processing unit 200 which will be described later.

For example, the input buffer circuit 104A includes an analog-digital converter 105A (hereinafter referred to as an AD converter denoted by AD in the figure) for input of phase A, a buffer for signal amplification which is not illustrated, a transformer 106A (denoted by T in the figure) for insulation, and the like. The transformer 106A for insulation, the buffer for signal amplification and the AD converter 105A are connected in the order in which they are listed. Likewise, the input buffer circuit 104B also includes an AD converter 105B for input of phase B, a buffer for signal amplification which is not illustrated, a transformer 106B, and the like. The transformer 106B for insulation, the buffer for signal amplification and the AD converter 105B are connected in the order in which they are listed.

The AD converters 105A and 105B respectively convert analog signals with phase A and phase B output from the resolver 2 into digital values. A timing at which the AD converters 105A and 105B perform conversion is defined by a sampling command signal output from a sampling command signal generation processor which is not illustrated and is at predetermined time intervals set in advance. The AD converters 105A and 105B supply the converted digital values to the resolver signal processing unit 200.

The resolver signal processing unit 200 converts the two-phase signal supplied as digital values into phase information corresponding to the phase of the resolver 2 and supplies the phase information to the inverter 4 through the output buffer circuits 101A and 101B.

The inverter 4 includes a semiconductor switching element and an inverter controller which are not illustrated. The inverter 4 receives a supply of the mechanical angle phase estimate θrm_hat of the motor 3 from the resolver signal processing unit 200 and drives the motor 3 according to the mechanical angle phase estimate θrm_hat.

Next, the resolver signal processing unit 200 will be described.

The resolver signal processing unit 200 includes a deviation calculation unit 201, a PI controller 204 (denoted by PI in the figure), a limiter 205, an integrator 206 (integration operation unit), conversion processing units 207 and 208, a subtractor 209, a reference signal generation unit 210, an adder 211, a failure diagnosis unit 212, a switch 213, and an excitation phase estimate generation unit 215. The PI controller 204, the limiter 205, the integrator 206, and the adder 211 are an example of an operation processing unit.

The deviation calculation unit 201 includes multipliers 202A and 202B and a subtractor 203.

The input of the multiplier 202A is connected to the output of the AD converter 105A and the output of the conversion processing unit 207 which will be described later. The multiplier 202A multiplies a signal component of phase A supplied from the AD converter 105A by a sine-wave signal sin θref supplied from the conversion processing unit 207 to obtain a first product. The multiplier 202A supplies the first product to a first input of the subtractor 203 connected to the output thereof.

The input of the multiplier 202B is connected to the output of the AD converter 105B and the output of the conversion processing unit 207 which will be described later. The multiplier 202B multiplies a signal component of phase B supplied from the AD converter 105B by a cosine-wave signal cos θref supplied from the conversion processing unit 207 to obtain a second product. The multiplier 202B supplies the second product to a second input of the subtractor 203 connected to the output thereof.

The subtractor 203 subtracts the value of the second product calculated by the multiplier 202B from the value of the first product calculated by the multiplier 202A and supplies the difference to the PI controller 204. The difference calculated by the subtractor 203 is referred to as a deviation sin(θref−θ0).

The PI controller 204 carries out first integration processing for integrating the deviation sin(θref−θ0), gain multiplication processing for multiplying the deviation sin(θref−θ0) by a constant, and operation processing for adding a result of the gain multiplication processing to a result of the first integration processing. This is referred to as a proportional integration operation. The value of the operation result of the PI controller 204 has the dimensions of an excitation angular frequency (or frequency) and this is called an excitation angular frequency ωex. The constant of the gain multiplication processing depends on the type of the resolver 2. This will be described later.

The adder 211 adds the excitation angular frequency ωex that is the operation result of the PI controller 204 to a reference angular frequency ωref which will be described later and outputs the result. This result is referred to as an excitation angular frequency compensation value ωex_comp.

The limiter 205 limits the excitation angular frequency compensation value ωex_comp supplied from the adder 211 to a value in a desired range. For example, the limiter 205 may output the excitation angular frequency compensation value ωex_comp without limiting it in a case where the excitation angular frequency compensation value ωex_comp does not exceed a desired range based on a predetermined threshold value and limits the excitation angular frequency compensation value ωex_comp to a predetermined value in a case where the excitation angular frequency compensation value ωex_comp exceeds the desired range. Meanwhile, a case in which the excitation angular frequency compensation value ωex_comp does not exceed a desired range based on a predetermined threshold value is an example of a case in which the excitation angular frequency compensation value ωex_comp based on the operation result of the PI controller 204 satisfies a predetermined condition.

The integrator 206 carries out, for example, second integration processing for integrating the excitation angular frequency compensation value ωex_comp. However, in a case where the excitation angular frequency compensation value ωex_comp has been limited by the limiter 205, the integrator 206 integrates the limited value instead of the excitation angular frequency compensation value ωex_comp. The operation result of the integrator 206 is referred to as an excitation phase Sex.

The subtractor 209 subtracts the value of the excitation phase θex which is the operation result of the integrator 206 from the value of the reference phase θref supplied from the reference signal generation unit 210.

The excitation phase estimate generation unit 215 generates an excitation phase estimate θrm_hat on the basis of the operation result of the subtractor 209.

The reference signal generation unit 210 generates the reference angular frequency ωref and the reference phase θref on the basis of a reference frequency fief. The reference signal generation unit 210 may generate the reference phase θref by integrating the reference angular frequency ωref.

The conversion processing unit 207 converts the aforementioned reference phase θref into a cosine-wave signal cos θref and a sine-wave signal sin θref. The sine-wave signal sin θref is supplied to the multiplier 202A of the deviation calculation unit 201. The cosine-wave signal cos θref is supplied to the multiplier 202B of the deviation calculation unit 201.

The conversion processing unit 208 converts any of the aforementioned excitation phase θex and the aforementioned reference phase θref supplied through the switch 213 into a cosine-wave signal cos θex and a sine-wave signal sin θex. The sine-wave signal sin θex is supplied to the input of the output buffer circuit 101A. The cosine-wave signal cos θex is supplied to the input of the output buffer circuit 101B.

The switch 213 has a first input connected to the output of the integrator 206, a second input connected to the output of the reference signal generation unit 210, and a control input connected to the output of the failure diagnosis unit 212. The excitation phase θex is supplied to the first input of the switch 213 from the integrator 206, the reference phase θref is supplied to the second input from the reference signal generation unit 210, and a detection result (signal ZERO_FBK) of a disconnection state mode is supplied to the control terminal from the failure diagnosis unit 212. For example, the switch 213 outputs the excitation phase θex when the signal ZERO_FBK at a level H is supplied to the control terminal and outputs the reference phase θref when the signal ZERO_FBK at a level L is supplied to the control terminal. For example, the switch 213 selects any of the excitation phase θex and the reference phase θref on the basis of an identification result of a mode identification unit 212B which will be described later and outputs the selection result.

The input of the failure diagnosis unit 212 is connected to the output of the AD converter 105A and the output of the AD converter 105B. The output of the failure diagnosis unit 212 is connected to the control terminal of the switch 213 which will be described later and a host device which is not illustrated.

The failure diagnosis unit 212 includes, for example, a disconnection detection unit 212A and the mode identification unit 212B.

For example, a first input of the disconnection detection unit 212A is connected to the output of the AD converter 105A. A second input of the disconnection detection unit 212A is connected to the output of the AD converter 105B. The disconnection detection unit 212A detects a disconnection state that has occurred in a signal from any of a first signal system which supplies an excitation signal of the resolver 2 and a second signal system of output signals on the basis of a signal component of phase A supplied from the AD converter 105A and a signal component of phase B supplied from the AD converter 105B and outputs a signal DISCON_ERR based on the detection result.

The input of the mode identification unit 212B is connected to the output of the disconnection detection unit 212A. The mode identification unit 212B identifies whether a disconnection state has occurred in any of the first signal system which supplies an excitation signal of the resolver 2 and the second signal system of an output signal on the basis of the detection result of the disconnection detection unit 212A. The mode identification unit 212B outputs the signal ZERO_FBK based on the identification result.

The failure diagnosis unit 212 of an embodiment will be described with reference to FIG. 3.

Figure 3:
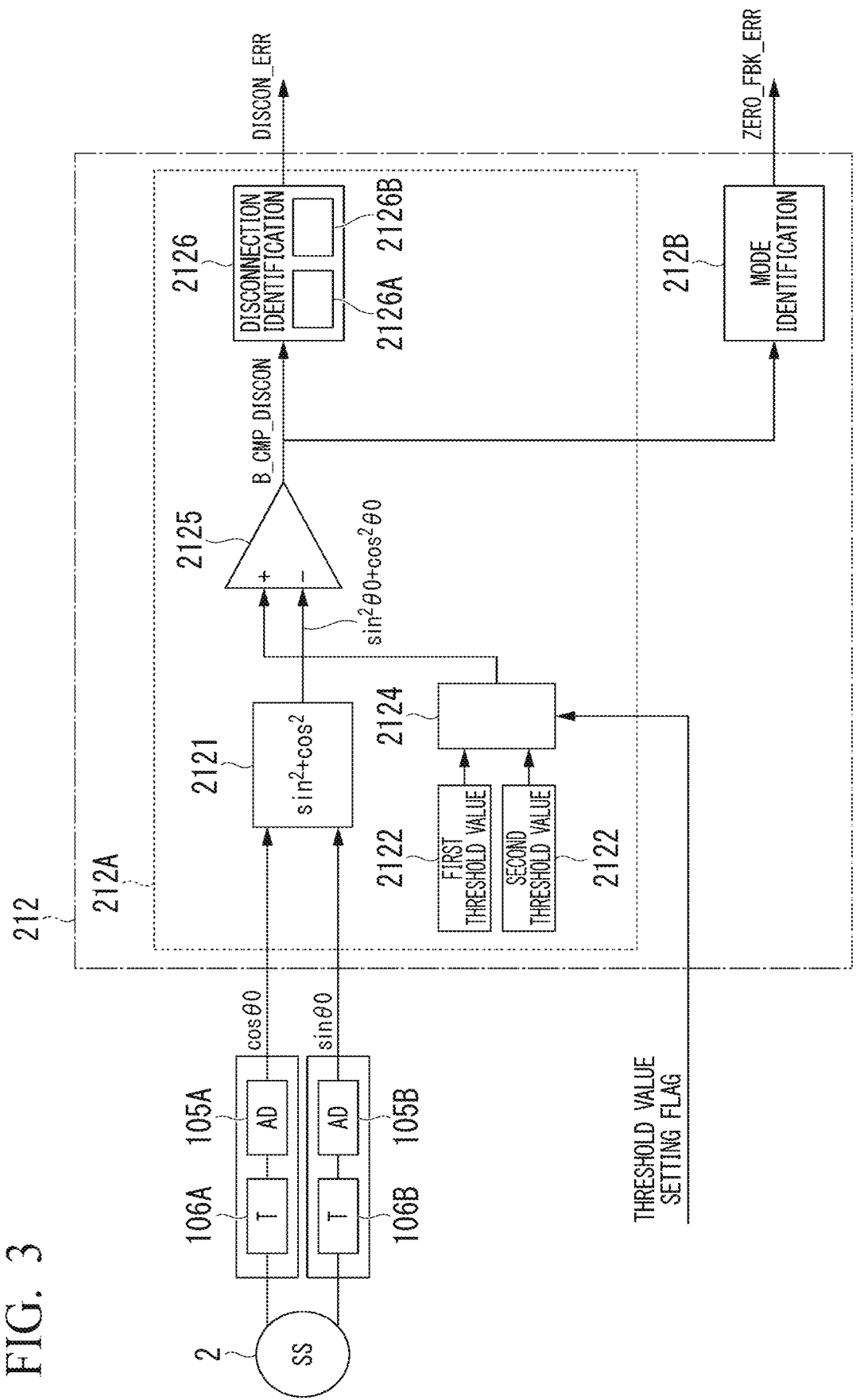
FIG. 3 is a configuration diagram of a failure diagnosis unit of an embodiment.

FIG. 3 is a configuration diagram of the failure diagnosis unit 212 of an embodiment.

The disconnection detection unit 212A includes, for example, an output signal state detection unit 2121, a first threshold value generation unit 2122 (denoted by a first threshold value in the figure), a second threshold value generation unit 2123 (denoted by a second threshold value in the figure), a threshold value setting unit 2124, a comparator 2125, and a disconnection identification unit 2126.

The output signal state detection unit 2121 calculates the sum of squares of a signal sin θ0 with phase A and a signal cos θ0 with phase B on the basis of a two-phase output signal of the resolver 2. In the following description, the signal sin θ0 with phase A will be referred to as a signal sin θ0, the signal cos θ0 with phase B will be referred to as a signal cos θ0, and the sum of squares of sin θ0 and cos θ0 ($\sin^2 θ0 + \cos^2 θ0$) will be referred to as a resolver FBK. The output signal state detection unit 2121 sequentially calculates the resolver FBK.

Meanwhile, if the resolver 2 can operate in a normal state, the value of the resolver FBK is greater than 0 and approximately constant. When a disconnection state in which both the signal with phase A and the signal with phase B become no signals occurs, the amplitudes of the signal with phase A and the signal with phase B become 0 and the value of the resolver FBK becomes 0. The value of the resolver FBK periodically changes in cases where disconnection occurs and the like in addition to the aforementioned case.

The first threshold value generation unit 2122 generates a first threshold value for detecting a state of the resolver FBK. This first threshold value may be a fixed value set in advance within a range in which periodic change in the resolver FBK can be detected.

The second threshold value generation unit 2123 generates a second threshold value for detecting a state of the resolver FBK. This second threshold value may be a fixed value set within a range in which periodic change in the resolver FBK can be detected like the aforementioned first threshold value. The second threshold value generation unit 2123 may determine the second threshold value according to a command from the host device which is not illustrated.

The threshold value setting unit 2124 sets any of the first threshold value and the second threshold value as a threshold value used for diagnosis according to a threshold value setting flag that is a command from the host device which is not illustrated and outputs the threshold value.

A non-inverting input of the comparator 2125 is connected to the output of the threshold value setting unit 2124 and provided with a threshold value set by the threshold value setting unit 2124. An inverting input of the comparator 2125 is connected to the output of the output signal state detection unit 2121 and provided with the resolver FBK. The comparator 2125 compares the resolver FBK with the threshold value set by the threshold value setting unit 2124 and outputs a comparison result B_CMP_DISCON. For example, the comparator 2125 outputs "0" in a case where the resolver FBK is greater than the threshold value set by the threshold value setting unit 2124 and outputs "1" in a case where the resolver FBK is equal to or less than the threshold value set by the threshold value setting unit 2124. An expectation of the output of the comparator 2125 in a case where there is no disconnection is "0." Accordingly, the comparator 2125 detects a change in the resolver FBK in a variation range exceeding the threshold value.

The disconnection identification unit 2126 identifies whether a disconnection state occurs in any of the first signal system that supplies the excitation signal of the resolver 2 and the second signal system of the output signal of the resolver 2 on the basis of the comparison result of the comparator 2125 and outputs the identification result. In a case where the comparison result of the comparator 2125 includes "1," disconnection is likely to have occurred.

The disconnection identification unit 2126 includes, for example, a counter 2126A and an identification processing unit 2126B.

The counter 2126A counts pulses included in the signal B_CMP_DISCON output from the comparator 2125 and outputs a count value that is a counting result.

For example, the counter 2126A samples the signal B_CMP_DISCON using a clock signal at a predetermined interval sufficiently shorter than the period of the output signal of the resolver 2 and counts the number of times the signal B_COM_DISCON has changed from "0" to "1." The identification processing unit 2126B is provided at the subsequent stage of the counter 2126A. The identification processing unit 2126B identifies the count value counted by the aforementioned counter 2126A on the basis of a predetermined threshold value and outputs the identification result as a signal DISCON_ERR. The counter 2126A is reset in synchronization with a clock signal in a predetermined period.

The input of the mode identification unit 212B is connected to the output of the comparator 2125. The mode identification unit 212B receives the comparison result B_COM_DISCON of the resolver FBK from the comparator 2125 and identifies a disconnection state (failure mode) on the basis of the comparison result.

For example, the mode identification unit 212B identifies a first mode in which the resolver 2 is continuously used in a case where a disconnection state is detected and a second mode in which use of the resolver 2 is stopped in a case where a disconnection state is detected on the basis of the output signal of the resolver 2 with respect to the resolver FBK. The mode identification unit 212B outputs level L when the first mode is identified and outputs level H when the second mode is identified.

First, an operation in a steady state in which disconnection failure is not generated will be described.

For example, in the case of a steady state in which disconnection failure is not generated, the failure diagnosis unit 212 determines that the resolver 2 is continuously used and operates the switch 213 as described above. Accordingly, the resolver signal processing unit 200 and the resolver 2 form a tracking loop. The resolver signal processing unit 200 calculates the excitation phase θex from phase A and phase B supplied from the resolver 2 according to operation of the tracking loop.

The aforementioned tracking loop operates such that the reference phase θref becomes identical to the phase θ0 (=θrm+θex) included in the resolver output. The difference θref−θ0 between the reference phase θref and the phase θ0 included in the resolver output becomes a value close to 0 according to PI control provided inside the tracking loop. Accordingly, the deviation sin(θref−θ0) can approximate θref−θ0. θref−θ0 is represented as AO.

The limiter 205 limits the excitation angular frequency compensation value ωex_comp to a desired range as described above so that the tracking loop operates according to the limited condition of the limiter 205. Accordingly, a steep change in the excitation phase θex can be inhibited.

A case in which disconnection has occurred will be described with reference to FIG. 4 and FIG. 5.

Figure 4:
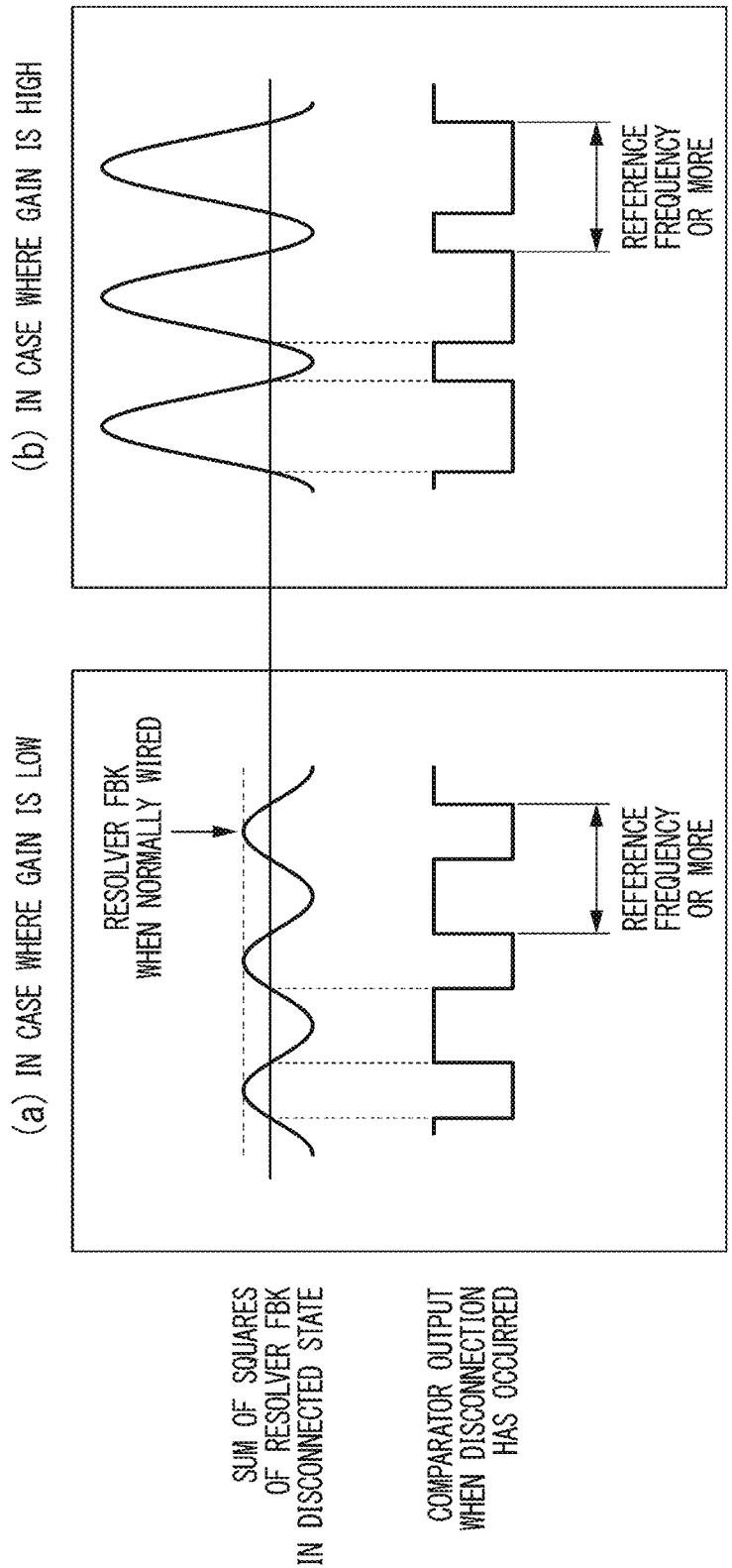
FIG. 4 is a diagram for describing a change in a signal in a case where disconnection has occurred.

FIG. 4 is a diagram for describing change in a signal in a case where disconnection has occurred.

A case in which a tracking loop gain is relatively low is illustrated in (a) of FIG. 4 and a case in which the tracking loop gain is relatively high is illustrated in (b) of FIG. 4. The waveform of the resolver FBK in a case where disconnection has occurred in a specific condition is illustrated in the upper part of (a) of FIG. 4 and the output B_CMP_DISCON of the comparator 2125 is illustrated in the lower part.

The waveform of the resolver FBK illustrated in (a) of FIG. 4 is a periodically repeated waveform. A chain line horizontally drawn to be in contact with the apexes of the waveform is a waveform of the resolver FBK in a case where disconnection has not occurred. When disconnection occurs, a phenomenon in which the resolver FBK is periodically repeated as illustrated in the figure occurs. The comparator 2125 identifies the waveform of the phenomenon of periodic repetition which has occurred in the resolver FBK using a predetermined threshold value and generates a signal in the lower part of the same figure. The aforementioned predetermined threshold value may be determined on the basis of a minimum value permitted as a resolver FBK where disconnection has not occurred.

For example, when the period of the aforementioned periodic signal is detected, a detection range may be determined on the basis of the reference frequency of the excitation signal of the resolver 2. For example, the period of the periodic signal may be shorter than the period of the reference frequency of the excitation signal of the resolver 2.

The waveform illustrated in (b) of FIG. 4 is the same as the waveform of (a) of FIG. 4 and the amplitude and center value of the resolver FBK of (b) of FIG. 4 are different from those of (a) of FIG. 4.

Figure 5:
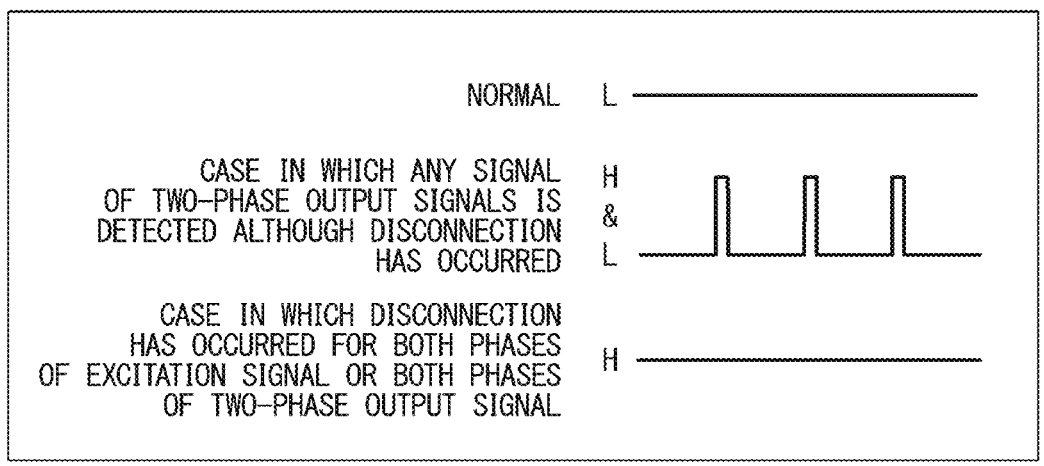
FIG. 5 is a diagram for describing detection of a spot where disconnection has occurred.

FIG. 5 is a diagram for describing detection of a spot where disconnection has occurred.

The waveform of the output B_CMP_DISCON of the comparator 2125 changes in three types due to a spot where disconnection has occurred, as illustrated in FIG. 5.

The upper part shows a waveform of a normal state in which disconnection does not occur. The waveform of the signal B_CMP_DISCON in this case is level L.

The middle part shows a waveform in a case where disconnection has occurred, but any signal is detected from any of two-phase output signals even when disconnection has occurred. The waveform of the signal B_CMP_DISCON in this case is a signal in which a pulse with level H is repeatedly superposed on the basis of level L.

The lower part shows a waveform in a state in which disconnection has occurred on both phases of the excitation signal or both phases of a two-phase output signal. The waveform of the signal B_CMP_DISCON in this case is level H.

The disconnection identification unit 2126 can cause control to be performed such that use of the resolver 2 is stopped by identifying a disconnection state on the basis of the aforementioned waveforms.

Here, differences in operation when failure occurs due to differences in positions at which disconnection failure occurs are arranged. The differences in operation are roughly divided as follows.

A mode in which a tracking operation is continued on the basis of the output signal of the resolver 2 even when disconnection failure occurs.

A mode in which the output signal of the resolver 2 disappears and a tracking operation cannot be continued when disconnection failure occurs The resolver signal processing unit 200 identifies each of the aforementioned modes.

For example, in a case where the disconnection identification unit 2126 detects a failure state in which disconnection failure has occurred, the failure diagnosis unit 212 operates the switch 213 such that use of the resolver 2 is stopped. Accordingly, the resolver signal processing unit 200 cancels the tracking loop with respect to the resolver 2 by performing open loop control on the excitation frequency of the resolver 2.

A peripheral circuit with respect to control of the resolver 2 includes the transformers 103A, 103B, 106A, 106B, and the like. An applicable frequency band is defined for each transformer. When a transformer transforms a signal including a frequency component that exceeds an applicable frequency band, the transformer may overheat according to characteristics of the transformer. Although the resolver signal processing unit 200 can identify the aforementioned modes and normally performs closed loop control on the excitation frequency of the resolver 2, in a case where closed loop control is in an unstable state due to the aforementioned disconnection failure, a control system may be stabilized by switching closed loop control to open loop control. Accordingly, it is possible to protect the peripheral circuit with respect to control of the resolver 2 without causing a transformer to transform a signal including a frequency component that exceeds an applicable frequency band.

The operation of the resolver signal processing unit 200 of an embodiment will be described using measurement results illustrated in FIG. 6A to FIG. 13D.

Figure 6A:
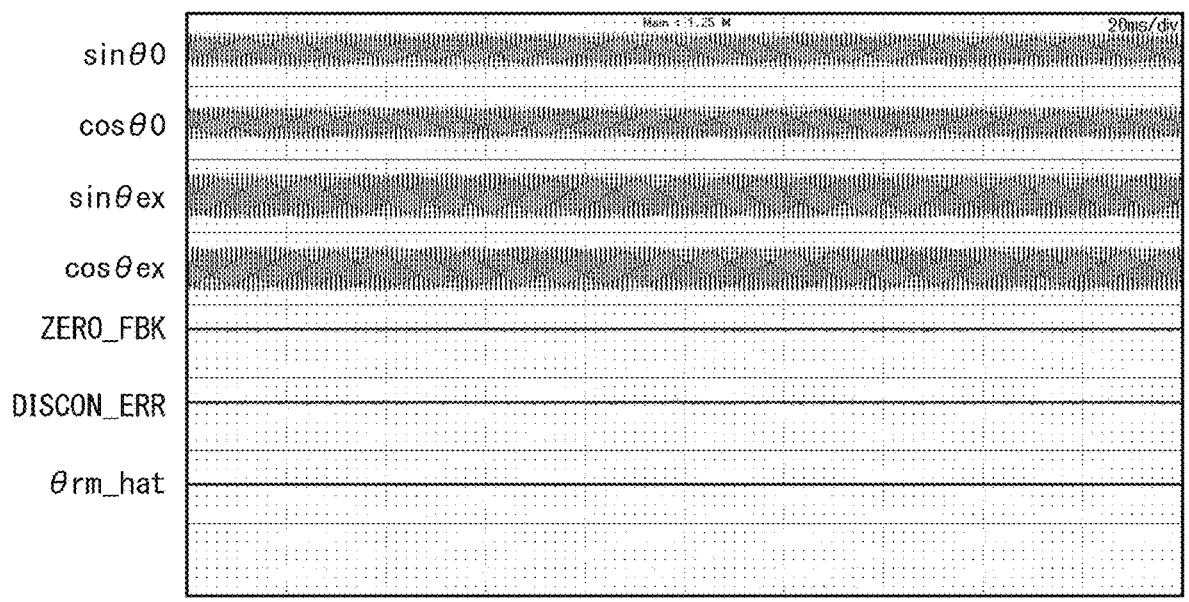
FIG. 6A is a diagram for describing an operation in a state in which disconnection does not occur during suspension.
Figure 6B:
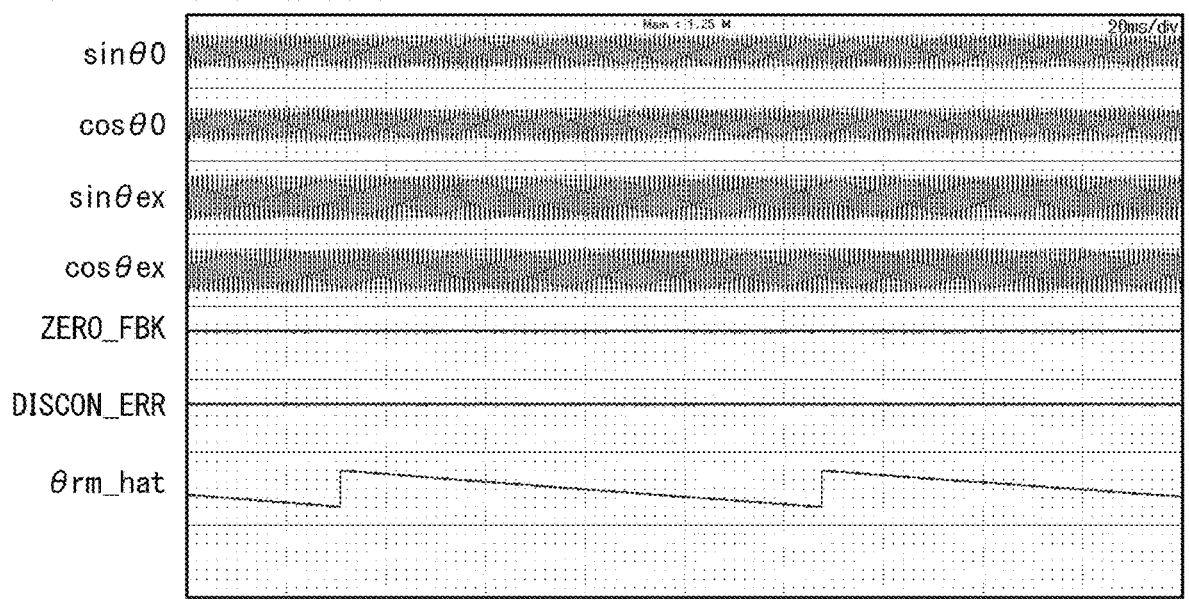
FIG. 6B is a diagram for describing an operation in a state in which disconnection does not occur during operation.

FIG. 6A is a diagram for describing an operation in a state in which disconnection does not occur during suspension. FIG. 6B is a diagram for describing an operation in a state in which disconnection does not occur during rotation. The X axes of waveform diagrams shown in FIG. 6A and FIG. 6B represent the elapse of time. The indicated period is 200 ms. The waveform diagrams shown in FIG. 6A and FIG. 6B represent the waveforms of the signal sin θ0, the signal cos θ0, the signal sin θex, the signal cos θex, the signal ZERO_FBK, the signal DISCON_ERR, and the mechanical angle phase estimate θrm_hat from top to bottom. The arrangement of the signals in the waveform diagrams is the same as those in the figures which will be described later except particularly described cases. The excitation frequency of the resolver 2 during the measurement is 1 kHz. The same applies to the figures which will be described later.

As illustrated in FIG. 6A and FIG. 6B, the signal sin θ0, the signal cos θ0, the signal sin θex, and the signal cos θex periodically change over the indicated period. As illustrated in FIG. 6A and FIG. 6B, the signal ZERO_FBK and the signal DISCON_ERR are level H over the indicated period since disconnection has not occurred in each signal.

For example, the signal ZERO_FBK becomes level L at normal times if the resolver FBK is not zero. The signal ZERO_FBK becomes H when the resolver FBK becomes zero due to occurrence of failure or disconnection, and the like.

For example, the signal DISCON_ERR is a signal representing a disconnection detection result. The signal DISCON_ERR becomes level H when disconnection is not detected. The signal DISCON_ERR becomes level L when disconnection is detected.

For example, the mechanical angle phase estimate θrm_hat represents a phase detected by the resolver signal processing unit 200.

Since the state illustrated in FIG. 6A is a situation in which the motor 3 stops, the mechanical angle phase estimate θrm_hat does not change. On the other hand, since the state illustrated in FIG. 6B is a situation in which the motor 3 rotates, periodic change in a triangular wave appears in the mechanical angle phase estimate θrm_hat.

The resolver signal processing unit 200 generates the aforementioned signals illustrated in FIG. 6A and FIG. 6B in a state in which disconnection has not occurred.

The operation of the resolver signal processing unit 200 varies according to a spot where disconnection occurs in a signal. Hereinafter, differences in the operation of the resolver signal processing unit 200 will be sequentially described in cases for spots where disconnection occurs.

Cases in which a spot where disconnection has occurred corresponds to the signal sin θex will be described with reference to FIG. 7A to FIG. 7H.

Figure 7A:
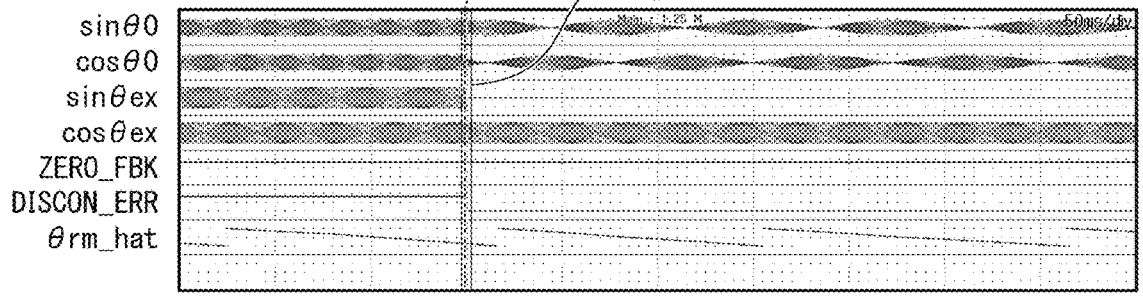
FIG. 7A is a diagram for describing an operation in a state in which disconnection has occurred in one phase of an excitation signal during operation.
Figure 7B:
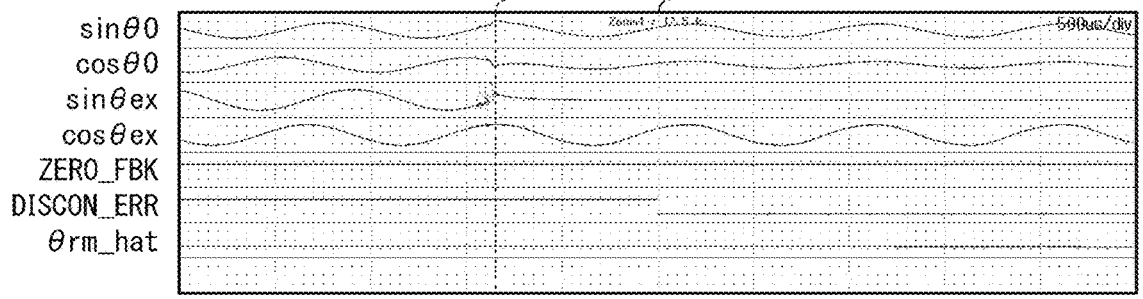
FIG. 7B is a diagram for describing an operation in a state in which disconnection has occurred in one phase of an excitation signal during operation.

FIG. 7A and FIG. 7B are diagrams for describing an operation in a case where disconnection has occurred during operation. FIG. 7B is an enlarged diagram in a time direction of a period VIIB including a time t711 illustrated in FIG. 7A. The period indicated in FIG. 7A is 500 ms. The period indicated in FIG. 7B is 5 ms.

As illustrated in FIG. 7A, disconnection occurs in the signal sin θex at the time t711 (detection time of 0.855 ms), and periodic change in the signal sin θex disappears and thus the amplitude thereof becomes 0 after that time. Even when disconnection has occurred as described above, the resolver signal processing unit 200 outputs the same periodically changing mechanical angle phase estimate θrm_hat as before disconnection occurs.

As illustrated in FIG. 7B, the resolver signal processing unit 200 represents that disconnection has been detected by causing the signal DISCON_ERR to be level L at a time t712 behind the time t711.

Figure 7C:
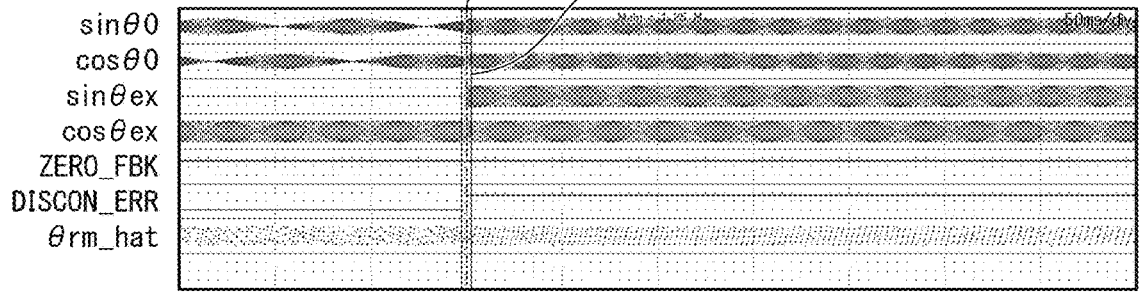
FIG. 7C is a diagram for describing an operation in a case where disconnection of one phase of an excitation signal has been recovered from during operation.
Figure 7D:
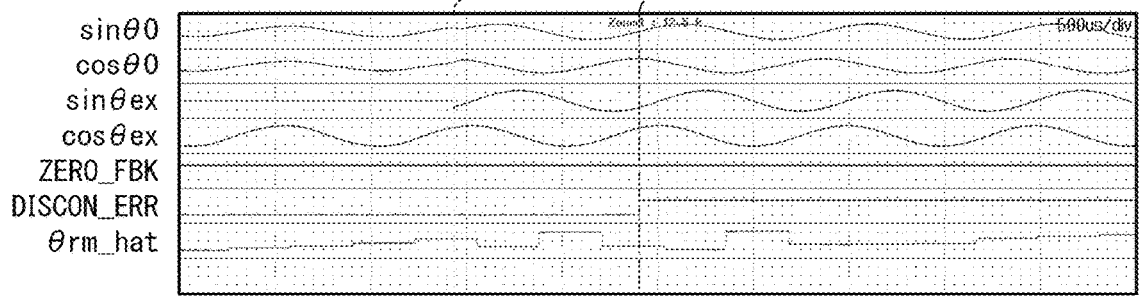
FIG. 7D is a diagram for describing an operation in a case where disconnection of one phase of an excitation signal has been recovered from during operation.

FIG. 7C and FIG. 7D are diagrams for describing an operation in a case where disconnection has been recovered during operation. FIG. 7D is an enlarged diagram in the time direction of a period VIID including a time t721 illustrated in FIG. 7C. The period indicated in FIG. 7C is 500 ms. The period indicated in FIG. 7D is 5 ms.

The mechanical angle phase estimate θrm_hat illustrated in FIG. 7C and FIG. 7D is obtained by first-order holding a sampling result.

As illustrated in FIG. 7C, disconnection of the signal sin θex is recovered at the time t721 (detection time of 0.855 ms), and periodic change in the signal sin θex is detected and the signal sin θ0 and the signal cos θ0 are stabilized after that time. When disconnection is recovered as described above, the resolver signal processing unit 200 detects and outputs a periodically changing phase.

As illustrated in FIG. 7D, the resolver signal processing unit 200 represents that disconnection has been recovered by causing the signal DISCON_ERR to be level H at a time t722 behind the time t721.

Figure 7E:
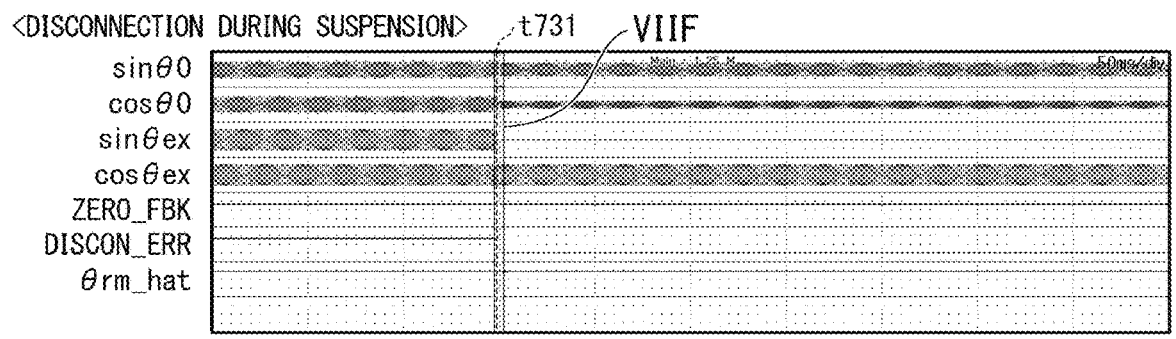
FIG. 7E is a diagram for describing an operation in a case where disconnection has occurred in one phase of an excitation signal during suspension.
Figure 7F:
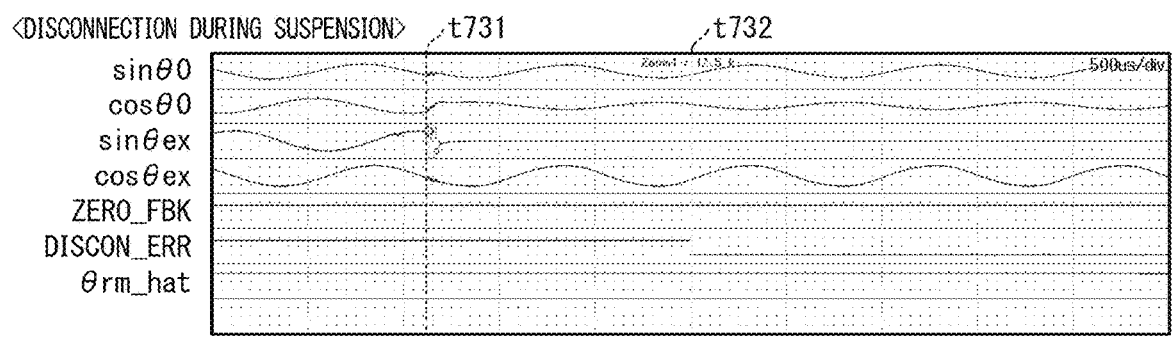
FIG. 7F is a diagram for describing an operation in a case where disconnection has occurred in one phase of an excitation signal during suspension.

FIG. 7E and FIG. 7F are diagrams for describing an operation in a case where disconnection has occurred during suspension. FIG. 7F is an enlarged diagram in the time direction of a period VIIF including a time t731 illustrated in FIG. 7E. The period indicated in FIG. 7E is 500 ms. The period indicated in FIG. 7F is 5 ms.

As illustrated in FIG. 7E, disconnection occurs in the signal sin θex at the time t731 (detection time of 1.385 ms), and periodic change in the signal sin θex disappears and thus the amplitude thereof becomes 0 after that time. Even when disconnection has occurred as described above, the resolver signal processing unit 200 outputs the same mechanical angle phase estimate θrm_hat having a fixed value as before disconnection occurs.

As illustrated in FIG. 7F, the resolver signal processing unit 200 represents that disconnection has been detected by causing the signal DISCON_ERR to be level L at a time t732 behind the time t731.

Figure 7G:
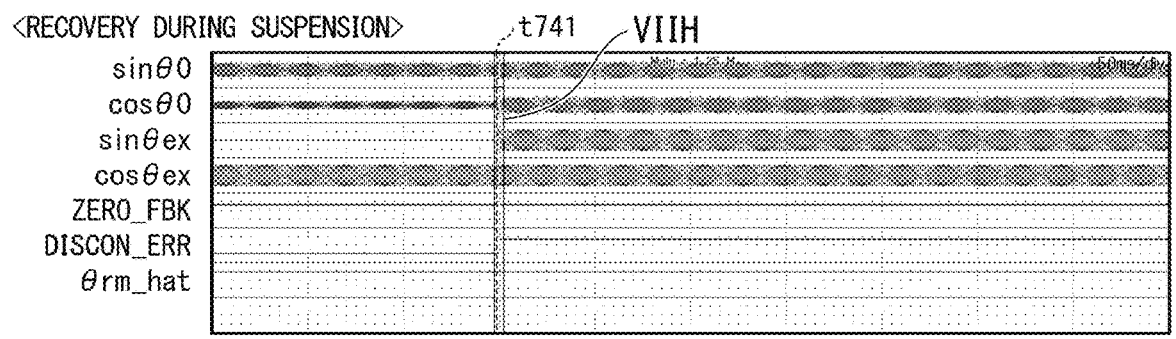
FIG. 7G is a diagram for describing an operation in a case where disconnection of one phase of an excitation signal has been recovered from during suspension.
Figure 7H:
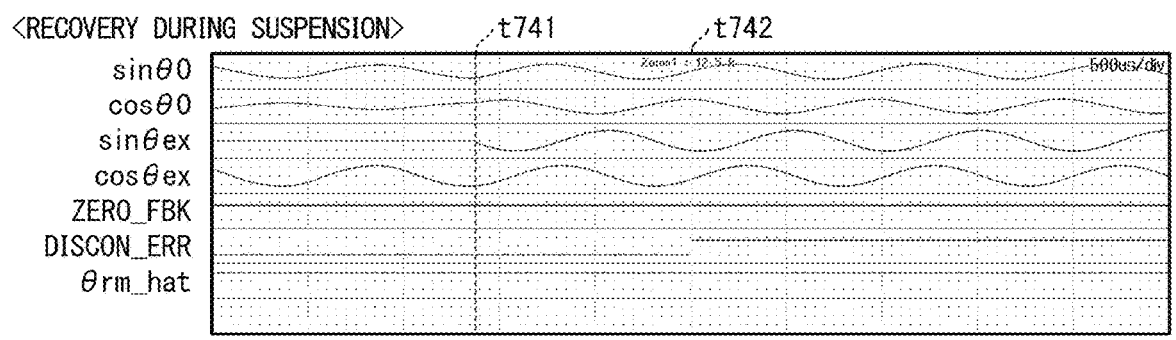
FIG. 7H is a diagram for describing an operation in a case where disconnection of one phase of an excitation signal has been recovered from during suspension.

FIG. 7G and FIG. 7H are diagrams for describing an operation in a case where disconnection has been recovered during suspension. FIG. 7H is an enlarged diagram in the time direction of a period VIIH including a time t741 illustrated in FIG. 7G. The period indicated in FIG. 7G is 500 ms. The period indicated in FIG. 7H is 5 ms.

As illustrated in FIG. 7G, disconnection of the signal sin θex is recovered at the time t741 (detection time of 1.125 ms), and periodic change in the signal sin θex disappears and thus the amplitude thereof becomes 0 after that time.

When disconnection is recovered as described above, the resolver signal processing unit 200 outputs the same mechanical angle phase estimate θrm_hat having a fixed value as before disconnection occurs.

As illustrated in FIG. 7H, the resolver signal processing unit 200 represents that disconnection has been recovered by causing the signal DISCON_ERR to be level H at a time t742 behind the time t741.

Cases in which a spot where disconnection has occurred corresponds to the signal sin θex and the signal cos θex will be described with reference to FIG. 8A to FIG. 8D.

Figure 8A:
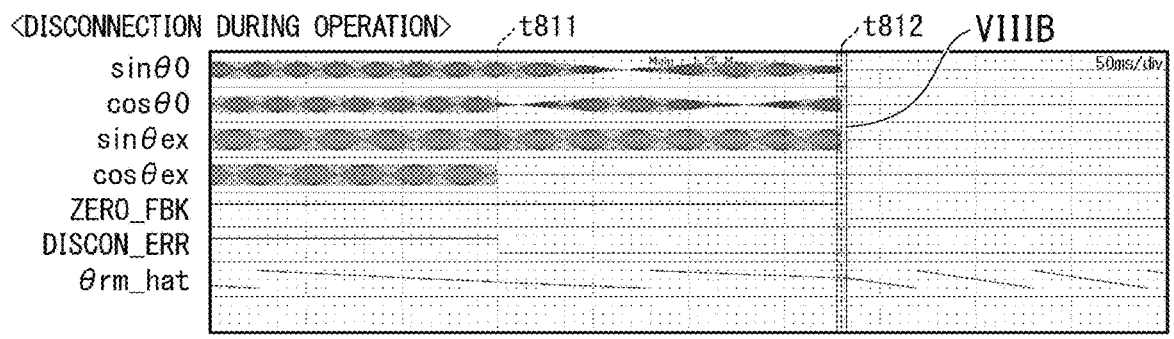
FIG. 8A is a diagram for describing an operation in a state in which disconnection has occurred in two phases of an excitation signal during operation.
Figure 8B:
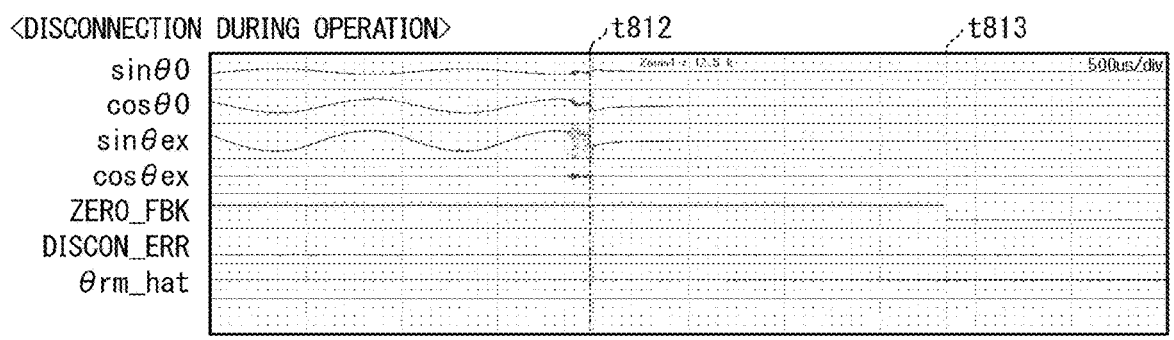
FIG. 8B is a diagram for describing an operation in a state in which disconnection has occurred in two phases of an excitation signal during operation.

FIG. 8A and FIG. 8B are diagrams for describing an operation in a case where disconnection has occurred during operation. FIG. 8B is an enlarged diagram in the time direction of a period VIIIB including a time t812 illustrated in FIG. 8A. The period indicated in FIG. 8A is 500 ms. The period indicated in FIG. 8B is 5 ms.

As illustrated in FIG. 8A, disconnection occurs in the signal cos θex at a time t811, and periodic change in the signal cos θex disappears and thus the amplitude thereof becomes 0 after that time. Disconnection also occurs in the signal sin θex at the time t812 (detection time of 1.865 ms), and periodic changes in the signal sin θ0 and the signal cos θ0 in addition to the signal sin θex disappear and thus the amplitudes thereof become 0 after that time. When disconnection of the aforementioned conditions has occurred, the resolver signal processing unit 200 outputs the periodically changing mechanical angle phase estimate θrm_hat, but the period thereof is inaccurate and becomes shorter than a normal value.

As illustrated in FIG. 8B, the resolver signal processing unit 200 represents that disconnection has been detected by causing the signal DISCON_ERR to be level L at a time t813 behind the time t811 and the time t812.

As described above, the resolver signal processing unit 200 represents that an accurate period cannot be reproduced in the mechanical angle phase estimate θrm_hat by representing that disconnection has been detected by causing the signal DISCON_ERR to be level L.

Figure 8C:
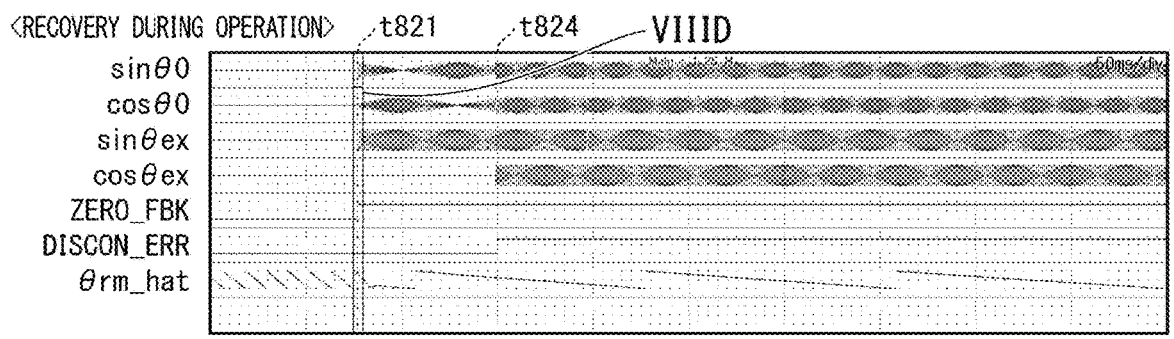
FIG. 8C is a diagram for describing an operation in a case where disconnection of two phases of an excitation signal has been recovered from during operation.
Figure 8D:
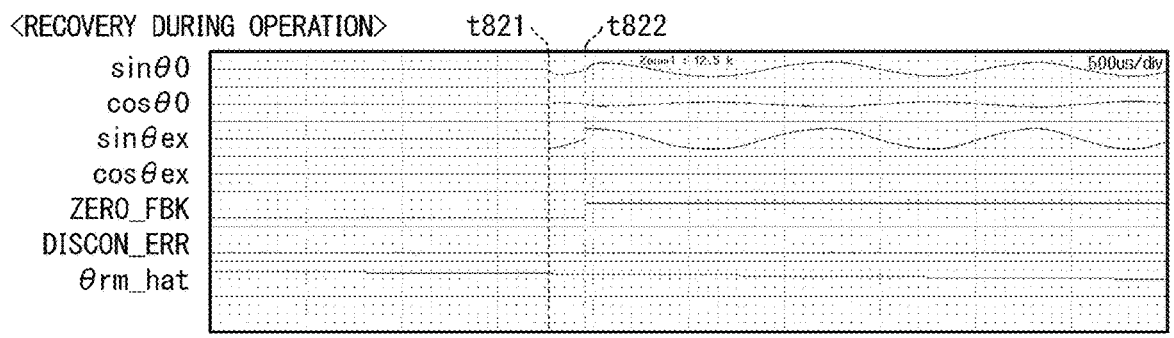
FIG. 8D is a diagram for describing an operation in a case where disconnection of two phases of an excitation signal has been recovered from during operation.

FIG. 8C and FIG. 8D are diagrams for describing an operation in a case where disconnection has been recovered during operation. FIG. 8D is an enlarged diagram in the time direction of a period VIIID including a time t821 illustrated in FIG. 8C. The period indicated in FIG. 8C is 500 ms. The period indicated in FIG. 8D is 5 ms.

As illustrated in FIG. 8C, disconnection of the signal sin θex is recovered at the time t821 (detection time of 0.190 ms), and the resolver signal processing unit 200 detects that the signal sin θ0 and the signal cos θ0 which have stopped due to disconnection of the two signals periodically change after that time. The resolver signal processing unit 200 returns the mechanical angle phase estimate θrm_hat to a period synchronized with a two-phase output signal from the period during disconnection in accordance with recovery of the aforementioned disconnection of the signal sin θex. The resolver signal processing unit 200 represents that disconnection has been recovered by causing the signal DISCON_ERR to be level H at a time t824.

As illustrated in FIG. 8D, the resolver signal processing unit 200 represents that the two-phase output signal can be detected by causing the signal ZERO_FBK to be level H at a time t822 behind the time t821.

Cases in which a spot where disconnection has occurred corresponds to the signal sin θex and the signal cos θ0 will be described with reference to FIG. 9A to FIG. 9D.

Figure 9A:
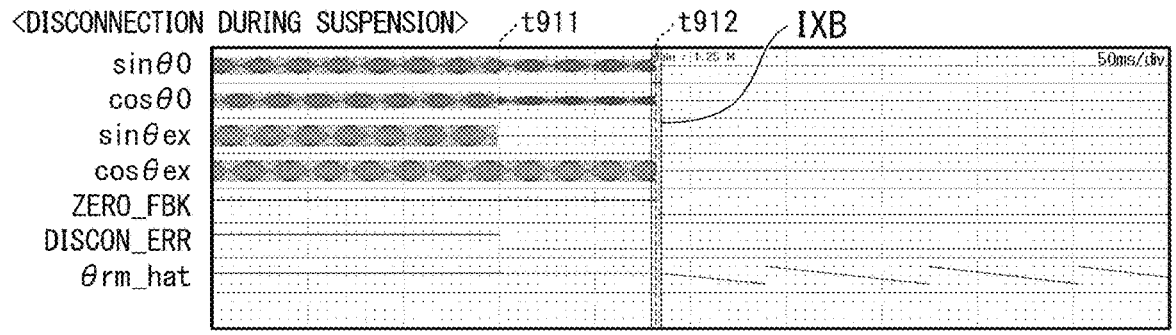
FIG. 9A is a diagram for describing an operation in a state in which disconnection has occurred in two phases of an excitation signal during suspension.
Figure 9B:
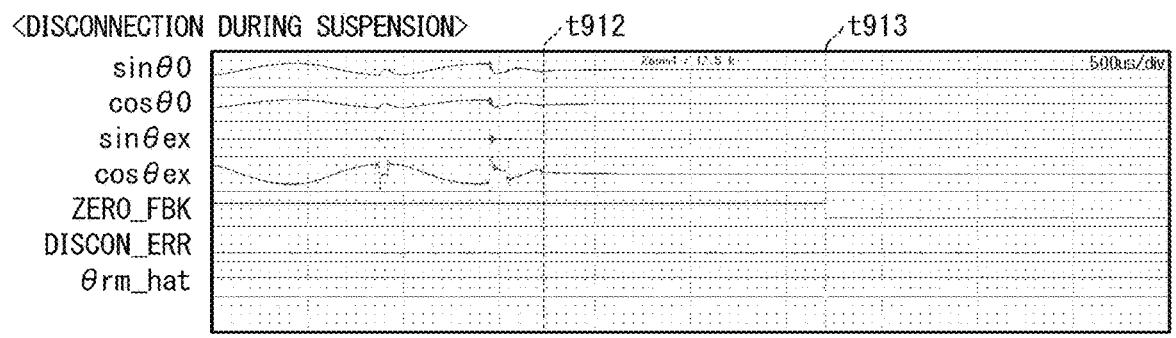
FIG. 9B is a diagram for describing an operation in a state in which disconnection has occurred in two phases of an excitation signal during suspension.

FIG. 9A and FIG. 9B are diagrams for describing an operation in a case where disconnection has occurred during suspension. FIG. 9B is an enlarged diagram in the time direction of a period IXB including a time t812 illustrated in FIG. 9A. The period indicated in FIG. 9A is 500 ms. The period indicated in FIG. 9B is 5 ms.

As illustrated in FIG. 9A, disconnection occurs in the signal sin θex at a time t911, and periodic change in the signal sin θex disappears and thus the amplitude thereof becomes 0 after that time.

The resolver signal processing unit 200 outputs the same mechanical angle phase estimate θrm_hat having a fixed value as before disconnection occurs even when independent disconnection occurs in the signal sin θex as described above.

Disconnection also occurs in the signal cos θex at the time t912 (detection time of 1.475 ms), and periodic changes in the signal sin θ0 and the signal cos θ0 in addition to the signal cos θex disappear and thus the amplitudes thereof become 0 after that time. When disconnection occurs in both the signal sin θex and the signal cos θex as described above, the resolver signal processing unit 200 cannot output a mechanical angle phase estimate θrm_hat having a fixed value different from that before the aforementioned disconnection occurs in both the signals and outputs a mechanical angle phase estimate θrm_hat representing as if the resolver rotates while it stops.

As illustrated in FIG. 9B, the resolver signal processing unit 200 represents that disconnection has been detected by causing the signal DISCON_ERR to be level L at a time t913 behind the time t911 and the time t912.

As described above, the resolver signal processing unit 200 represents that an accurate period cannot be reproduced in the mechanical angle phase estimate θrm_hat by representing that disconnection has been detected by causing the signal DISCON_ERR to be level L.

Figure 9C:
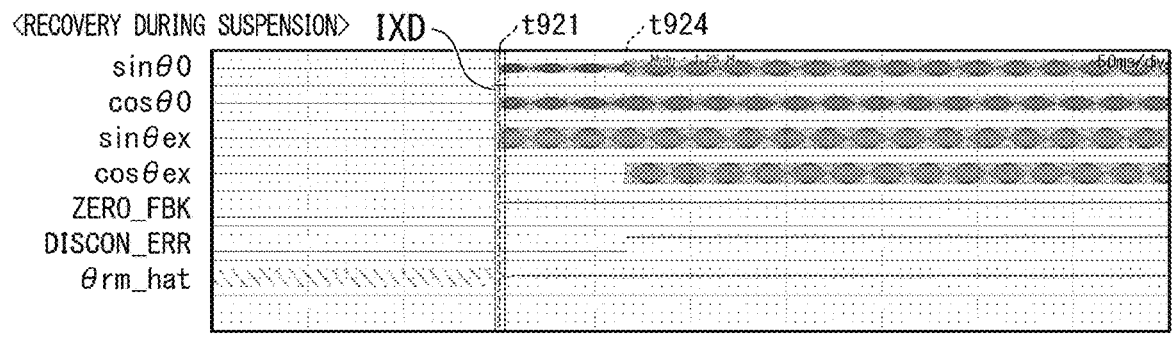
FIG. 9C is a diagram for describing an operation in a case where disconnection of two phases of an excitation signal has been recovered from during suspension.
Figure 9D:
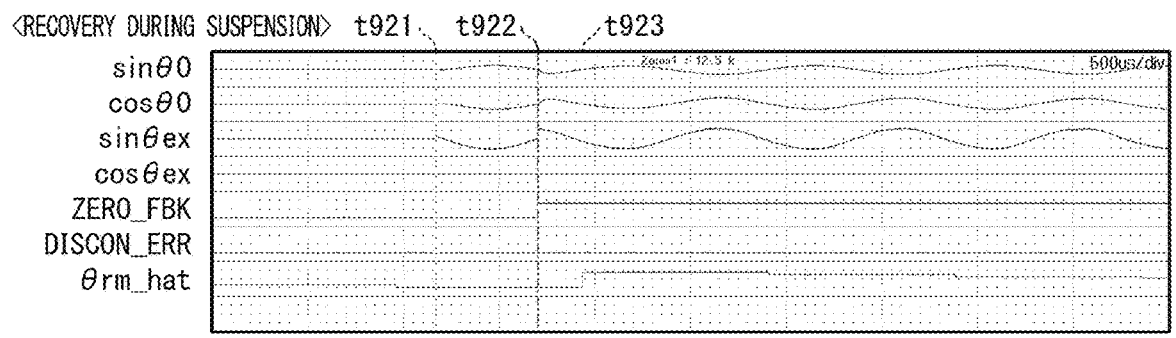
FIG. 9D is a diagram for describing an operation in a case where disconnection of two phases of an excitation signal has been recovered from during suspension.

FIG. 9C and FIG. 9D are diagrams for describing an operation in a case where disconnection has been recovered during suspension. FIG. 9D is an enlarged diagram in the time direction of a period IXD including a time t921 illustrated in FIG. 9C. The period indicated in FIG. 9C is 500 ms. The period indicated in FIG. 9D is 5 ms.

As illustrated in FIG. 9C, disconnection of the signal sin θex is recovered at the time t921 (detection time of 0.535 ms), and the resolver signal processing unit 200 detects the signal sin θ0 and the signal cos θ0 which have stopped due to disconnection of the two signals after that time.

The resolver signal processing unit 200 is in a self-propellent state according to disconnection of the two signals and outputs a value different from actual rotation as a mechanical angle phase estimate θrm_hat. The resolver signal processing unit 200 returns the mechanical angle phase estimate θrm_hat to a phase synchronized with a two-phase output signal in accordance with recovery of aforementioned disconnection of the signal sin θex. The resolver signal processing unit 200 represents that disconnection has been recovered by causing the signal DISCON_ERR to be level H at a time t924.

As illustrated in FIG. 9D, the resolver signal processing unit 200 represents that the two-phase output signal can be detected by causing the signal ZERO_FBK to be level H at a time t923 behind the time t921 and the time t922.

Cases in which a spot where disconnection has occurred corresponds to the signal sin θ0 and the signal sin θex will be described with reference to FIG. 10A to FIG. 11B.

Figure 10A:
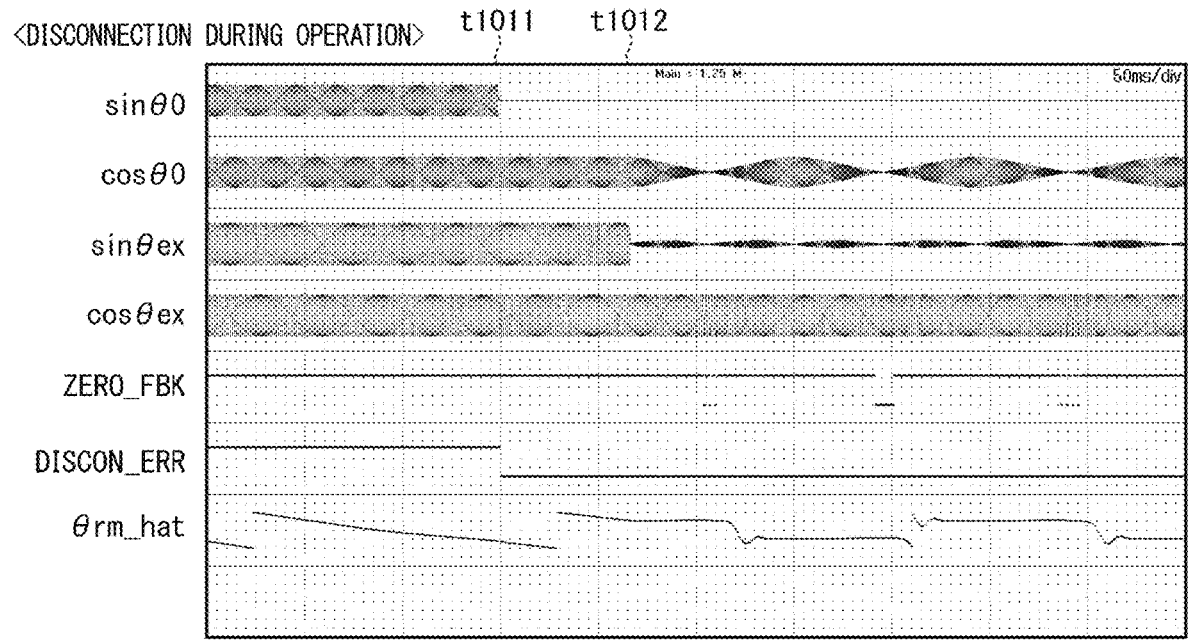
FIG. 10A is a diagram for describing an operation in a case where disconnection has occurred in one phase of an excitation signal and one phase of an output signal during operation.

FIG. 10A is a diagram for describing an operation in a case where disconnection has occurred during operation. The period indicated in FIG. 10A is 500 ms. The period is also 500 ms in the following figures.

As illustrated in FIG. 10A, disconnection occurs in the signal sin θ0 at a time t1011, and periodic change in the signal sin θ0 disappears and thus the amplitude thereof becomes 0 after that time. In response to this, the resolver signal processing unit 200 represents that disconnection has been detected by causing the signal DISCON_ERR to be level L.

Disconnection also occurs in the signal sin θex at a time t1012. Although the signal cos θ0 is detected because the signal cos θ0 is continuously supplied to the resolver 2 even after that time, the amplitude thereof becomes less than that before the time t1012 and thus is not stable. Although disconnection occurs in the signal sin θex, a minute signal due to induction is detected as the same signal. When disconnection of the aforementioned condition occurs, the resolver signal processing unit 200 outputs the mechanical angle phase estimation θrm_hat but the value and period thereof are inaccurate. This state can be identified from the signal DISCON_ERR at level L.

There is a period in which the signal ZERO_FBK is intermittently level L after the time t1012. The period in which this signal ZERO_FBK is level L is synchronized with a timing at which the signal cos θ0 periodically becomes a value close to 0.

Figure 10B:
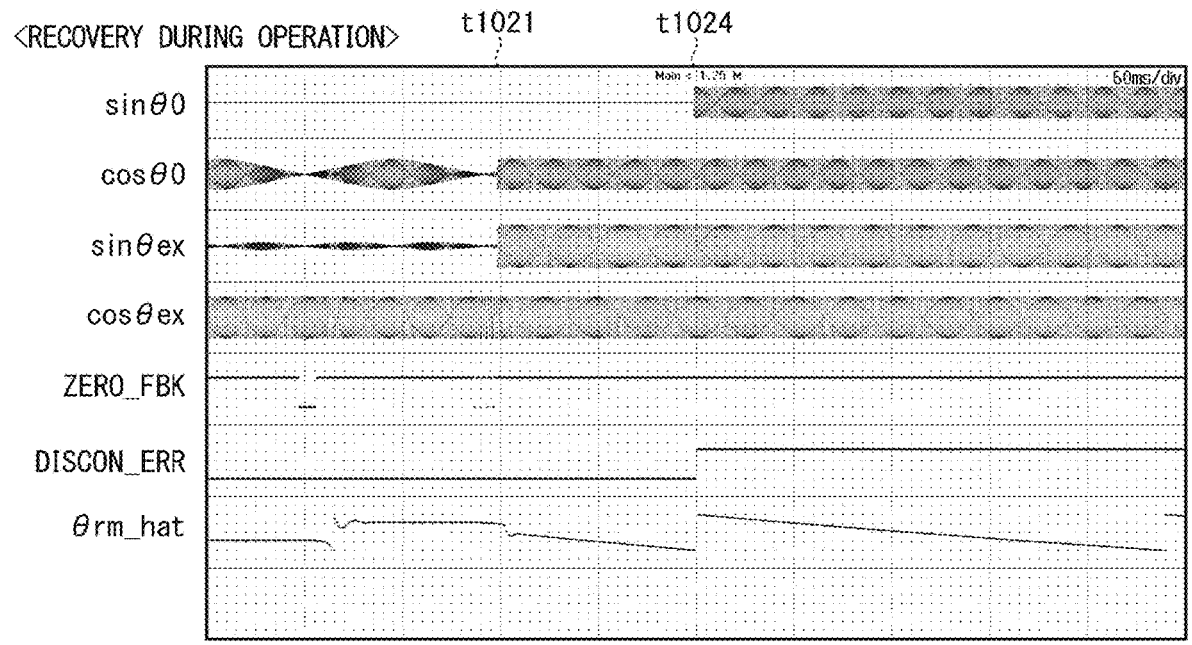
FIG. 10B is a diagram for describing an operation in a case where disconnection of one phase of an excitation signal and one phase of an output signal has been recovered from during operation.

FIG. 10B is a diagram for describing an operation in a case where disconnection has been recovered during operation.

As illustrated in FIG. 10B, disconnection of the signal sin θex is recovered at a time t1021, and the resolver signal processing unit 200 detects that the signal sin θex and the signal cos θ0 which have stopped due to disconnection of the two signals periodically change after that time.

The resolver signal processing unit 200 returns the mechanical angle phase estimation θrm_hat to a period synchronized with the signal cos θ0 from an instable state during disconnection in accordance with recovery of the aforementioned disconnection of the signal sin θex. However, the accuracy of the mechanical angle phase estimation θrm_hat is not at a level that can be guaranteed because disconnection of the signal sin θ0 continues.

The resolver signal processing unit 200 represents that disconnection has been recovered by causing the signal DISCON_ERR to be level H at a time t1024. In this stage, the accuracy of the mechanical angle phase estimation θrm_hat becomes a level that can guarantee desired accuracy.

Figure 11A:
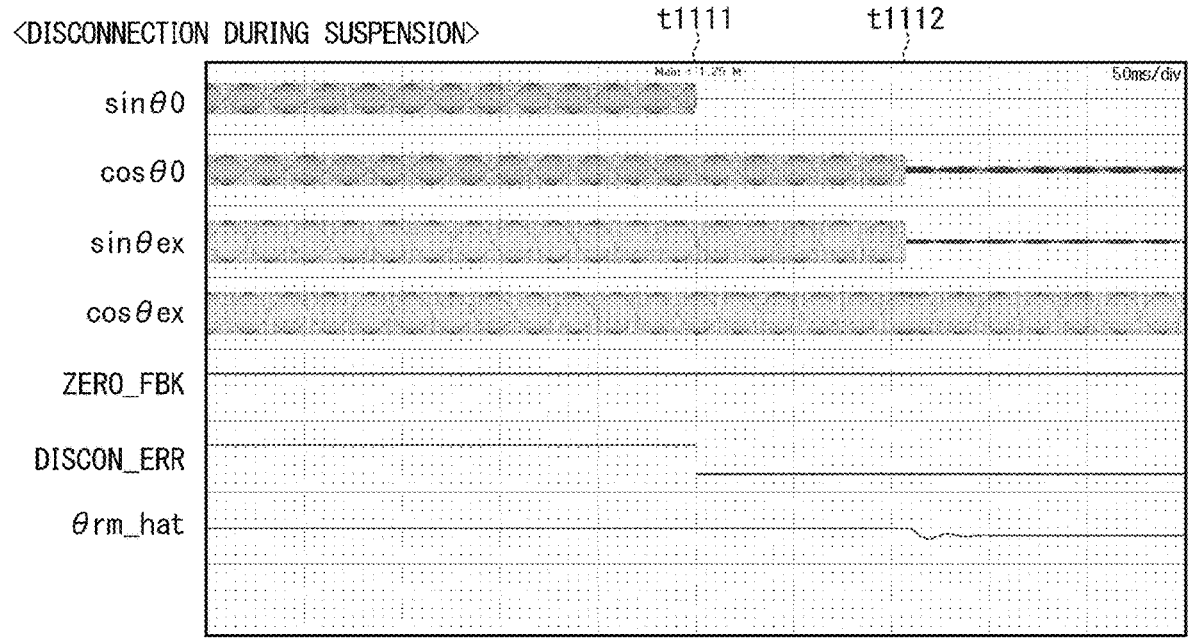
FIG. 11A is a diagram for describing an operation in a case where disconnection has occurred in one phase of an excitation signal and one phase of an output signal during suspension.

FIG. 11A is a diagram for describing an operation in a case where disconnection has occurred during suspension.

As illustrated in FIG. 11A, disconnection occurs in the signal sin θ0 at a time t1111, and periodic change in the signal sin θ0 disappears and thus the amplitude thereof becomes 0 after that time. In response to this, the resolver signal processing unit 200 represents that disconnection has been detected by causing the signal DISCON_ERR to be level L.

Disconnection also occurs in the signal sin θex at a time t1112. Although the signal cos θ0 is detected because the signal cos θ0 is continuously supplied to the resolver 2 even after that time, the amplitude thereof becomes less than that before the time t1112 and thus is not stable. Although disconnection occurs in the signal sin θex as described above, a minute signal due to induction is detected as the same signal. When disconnection of the aforementioned condition occurs, the resolver signal processing unit 200 outputs the mechanical angle phase estimation θrm_hat but an unnecessary offset is added to the value thereof and thus it becomes inaccurate. Meanwhile, this state can be identified from the signal DISCON_ERR at level L.

Figure 11B:
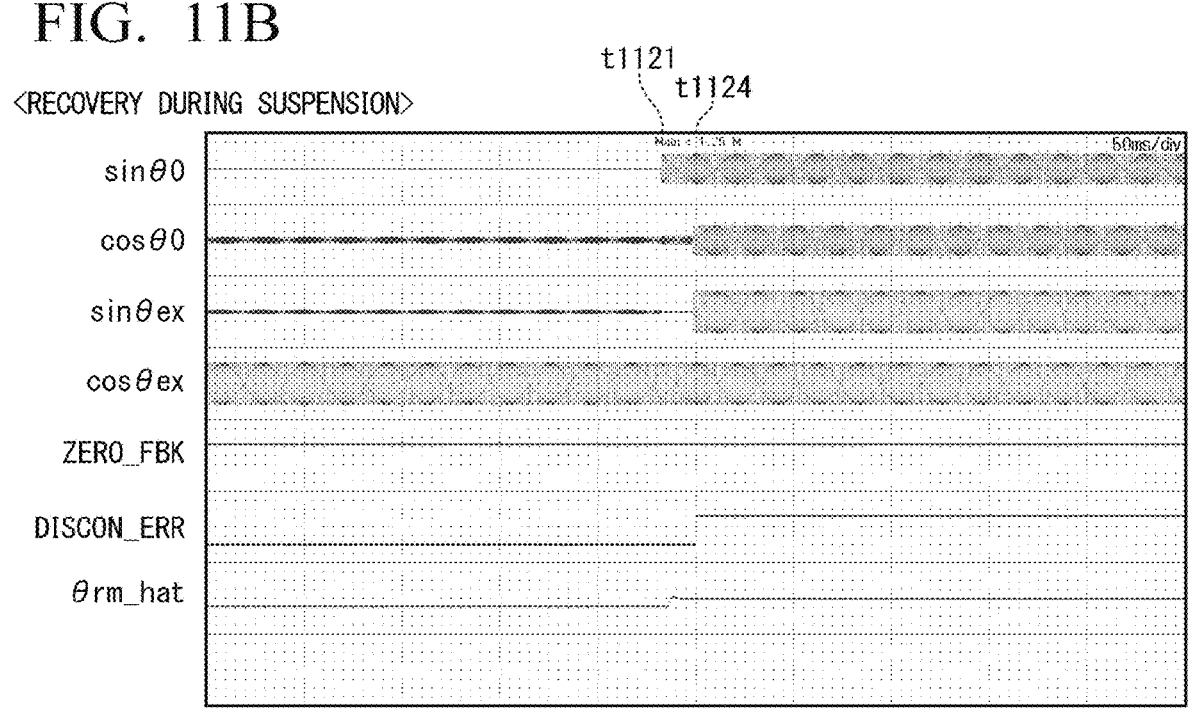
FIG. 11B is a diagram for describing an operation in a case where disconnection of one phase of an excitation signal and one phase of an output signal has been recovered from during suspension.

FIG. 11B is a diagram for describing an operation in a case where disconnection has been recovered during suspension.

As illustrated in FIG. 11B, disconnection of the signal sin θ0 is recovered at a time t1121, and the resolver signal processing unit 200 detects that the signal sin θ0 which has stopped due to disconnection of the two signals periodically changes after that time.

The mechanical angle phase estimate θrm_hat returns from the aforementioned state lacking in accuracy due to the offset to a state in which the offset has disappeared in accordance with recovery of the aforementioned disconnection of the signal sin θ0. However, the accuracy of the mechanical angle phase estimation θrm_hat is not at a level that can be guaranteed because disconnection of the signal sin θ0 continues.

Disconnection of the signal sin θ0 is recovered at a time t1124, and the resolver signal processing unit 200 represents that disconnection has been recovered by causing the signal DISCON_ERR to be level H. In this stage, the accuracy of the mechanical angle phase estimation θrm_hat becomes a level that can guarantee desired accuracy.

Cases in which a spot where disconnection has occurred corresponds to the signal cos θ0 and the signal sin θex will be described with reference to FIG. 12A to FIG. 12D.

Figure 12A:
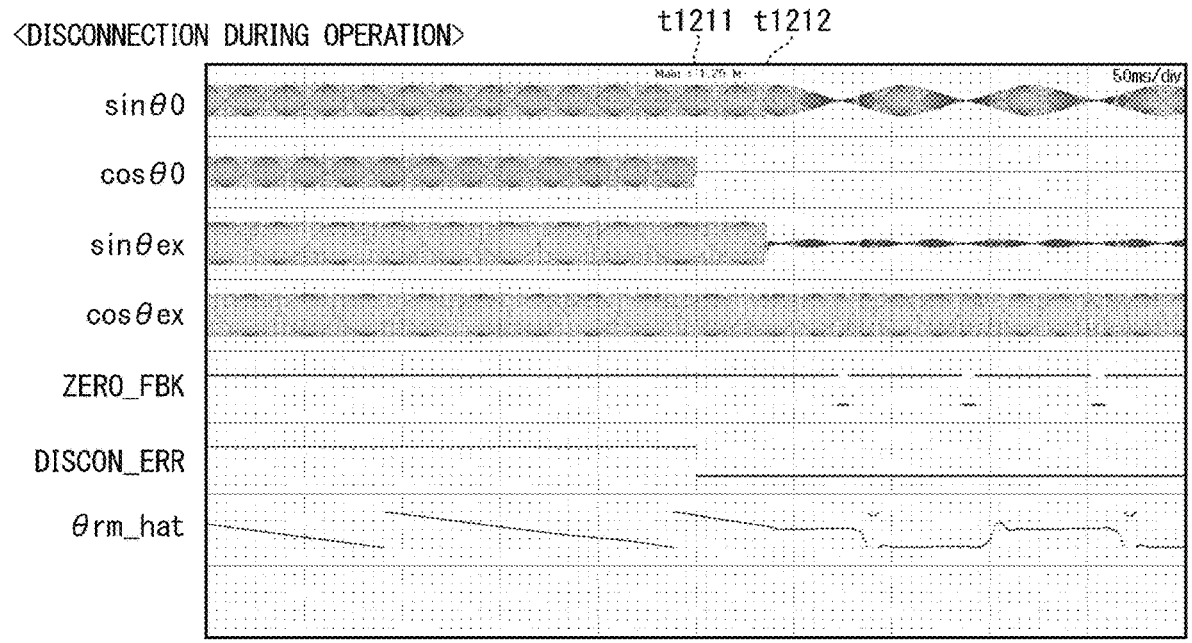
FIG. 12A is a diagram for describing an operation in a case where disconnection has occurred in one phase of an excitation signal and one phase of an output signal during operation.

FIG. 12A is a diagram for describing an operation in a case where disconnection has occurred during operation.

As illustrated in FIG. 12A, disconnection occurs in the signal cos θ0 at a time 11211, and periodic change in the signal cos θ0 disappears and thus the amplitude thereof becomes 0 after that time. In response to this, the resolver signal processing unit 200 represents that disconnection has been detected by causing the signal DISCON_ERR to be level L.

Disconnection also occurs in the signal sin θex at a time t1212. Although a signal is detected from the signal sin θ0 because the signal cos θex is continuously supplied to the resolver 2 even after that time, the amplitude thereof becomes less than that before the time t1212 and thus is not stable. Although disconnection occurs in the signal sin θex, a minute signal due to induction is detected as the same signal. When disconnection of the aforementioned condition occurs, the resolver signal processing unit 200 outputs the mechanical angle phase estimation θrm_hat but the value and period thereof are inaccurate. This state can be identified from the signal DISCON_ERR at level L.

Figure 12B:
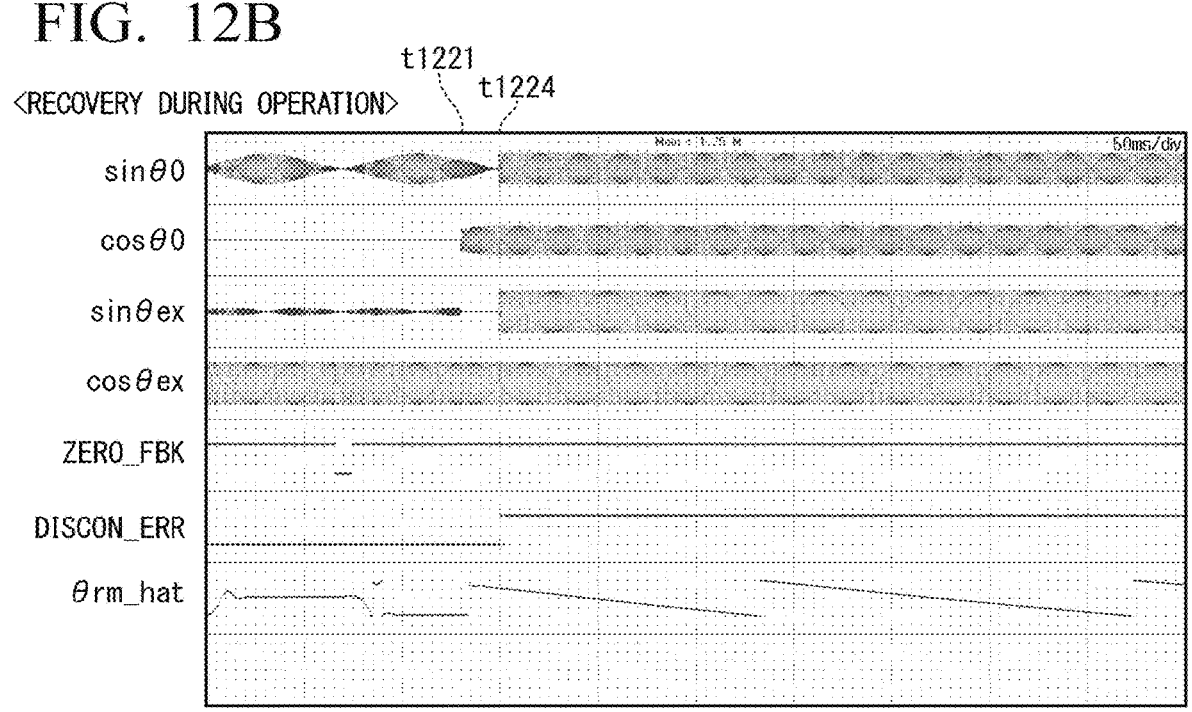
FIG. 12B is a diagram for describing an operation in a case where disconnection of one phase of an excitation signal and one phase of an output signal has been recovered from during operation.

FIG. 12B is a diagram for describing an operation in a case where disconnection has been recovered during operation.

As illustrated in FIG. 12B, even when disconnection of the signal cos θ0 is recovered at a time t1221, the instable state continues even after that time.

When disconnection of the signal sin θ0 is recovered at a time t1224, the resolver signal processing unit 200 represents that disconnection has been recovered by causing the signal DISCON_ERR to be level H. In this stage, the accuracy of the mechanical angle phase estimate θrm_hat becomes a level that can guarantee desired accuracy.

Figure 12C:
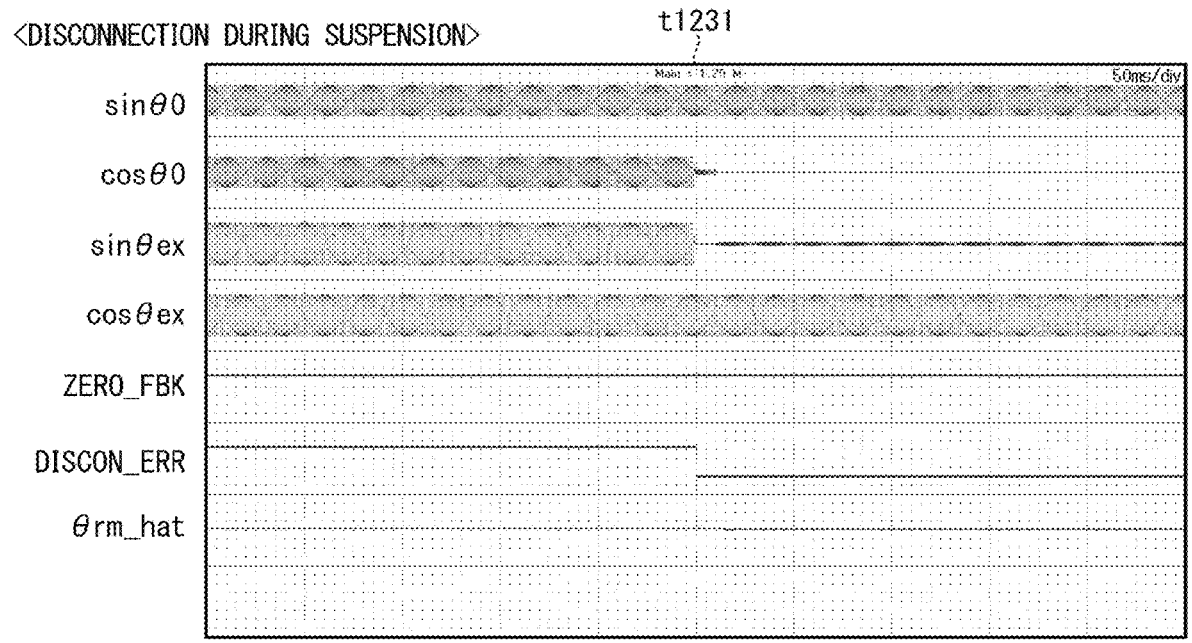
FIG. 12C is a diagram for describing an operation in a case where disconnection has occurred in one phase of an excitation signal and one phase of an output signal during suspension.

FIG. 12C is a diagram for describing an operation in a case where disconnection has occurred during suspension.

As illustrated in FIG. 12C, disconnection occurs in the signal cos θ0 and the signal sin θex at a time t1231, and periodic changes in the signal cos θ0 and the signal sin θex disappear and thus the amplitudes thereof become 0 after that time. In response to this, the resolver signal processing unit 200 represents that disconnection has been detected by causing the signal DISCON_ERR to be level L. Meanwhile, although disconnection occurs in the signal sin θex, the signal cos θex is continuously supplied to the resolver 2 even after that time and thus a minute signal due to induction is detected as the same signal. When disconnection of the aforementioned condition occurs, the resolver signal processing unit 200 outputs the mechanical angle phase estimate θrm_hat, but there are cases in which the value thereof includes minute change and thus the value become inaccurate. This state can be identified from the signal DISCON_ERR at level L.

Figure 12D:
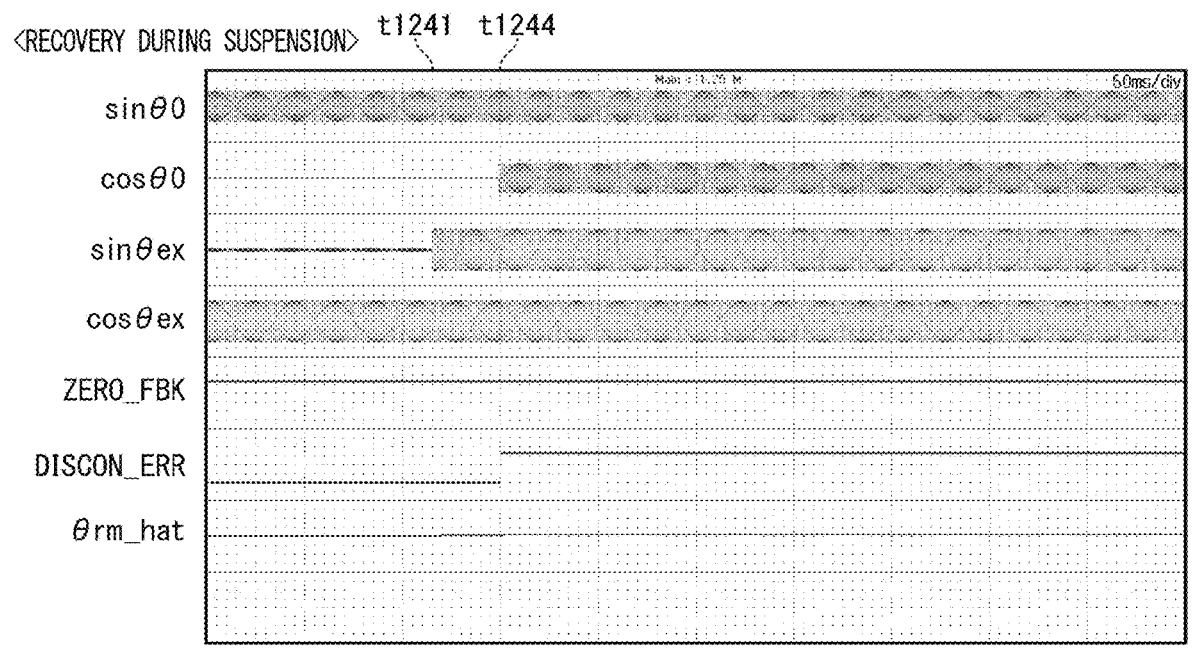
FIG. 12D is a diagram for describing an operation in a case where disconnection of one phase of an excitation signal and one phase of an output signal has been recovered from during suspension.

FIG. 12D is a diagram for describing an operation in a case where disconnection has been recovered during suspension.

As illustrated in FIG. 12D, although disconnection of the signal sin θex is recovered at a time 1241, significance change does not occur in each signal. Thereafter, when disconnection of the signal cos θ0 is recovered at a time t1244, the resolver signal processing unit 200 represents that disconnection has been recovered by causing the signal DISCON_ERR to be level H. In this stage, the accuracy of the mechanical angle phase estimate θrm_hat becomes a level that can guarantee desired accuracy.

Cases in which a spot where disconnection has occurred corresponds to the signal sin θ0 and the signal cos θ0 will be described with reference to FIG. 13A to FIG. 13D.

Figure 13A:
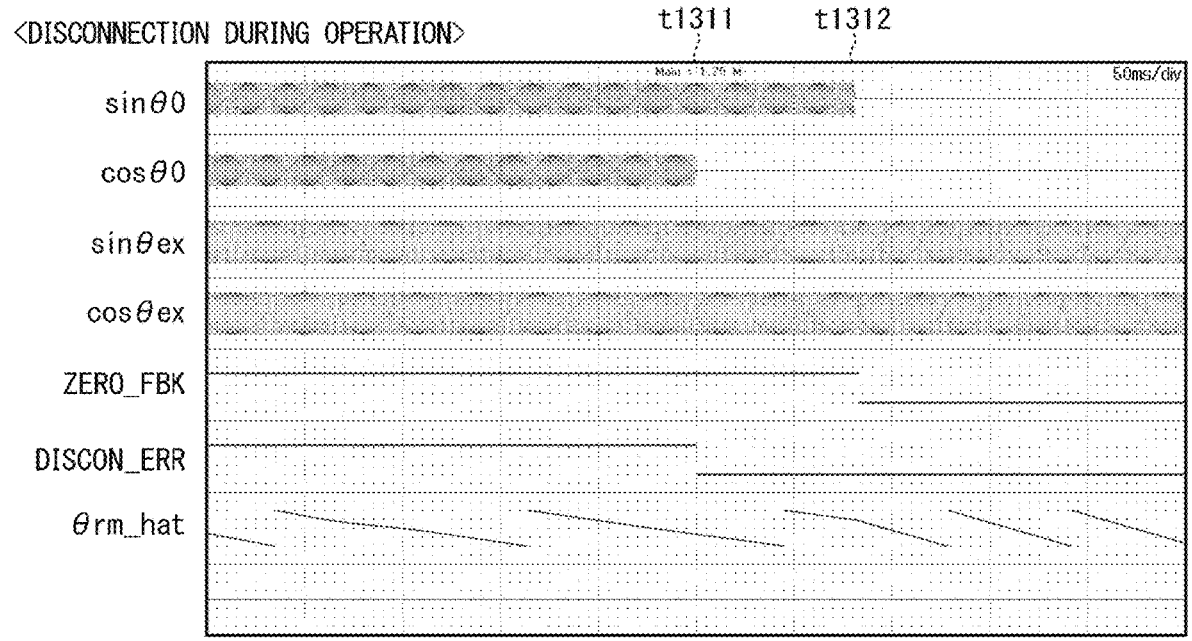
FIG. 13A is a diagram for describing an operation in a case where disconnection has occurred in two phases of an output signal during operation.

FIG. 13A is a diagram for describing an operation in a case where disconnection has occurred during operation.

As illustrated in FIG. 13A, disconnection occurs in the signal cos θ0 at a time t1311, and periodic change in the signal cos θ0 disappears and the amplitude thereof becomes 0 after that time. In response to this, the resolver signal processing unit 200 represents that disconnection has been detected by causing the signal DISCON_ERR to be level L.

Disconnection also occurs in the signal sin θ0 at a time t1312. Accordingly, the output signal from the resolver 2 is not supplied to the resolver signal processing unit 200. Even after that, the resolver signal processing unit 200 continuously supplies the signals sin θex and cos θex to the resolver 2. The resolver signal processing unit 200 represents that a two-phase output signal cannot be detected by causing the signal ZERO_FBK to be level L because the output signal from the resolver 2 is not supplied. When disconnection of the aforementioned condition occurs, the resolver signal processing unit 200 outputs the mechanical angle phase estimate θrm_hat, but the value and period thereof become inaccurate. This state can be identified from the signal DISCON_ERR at level L.

Figure 13B:
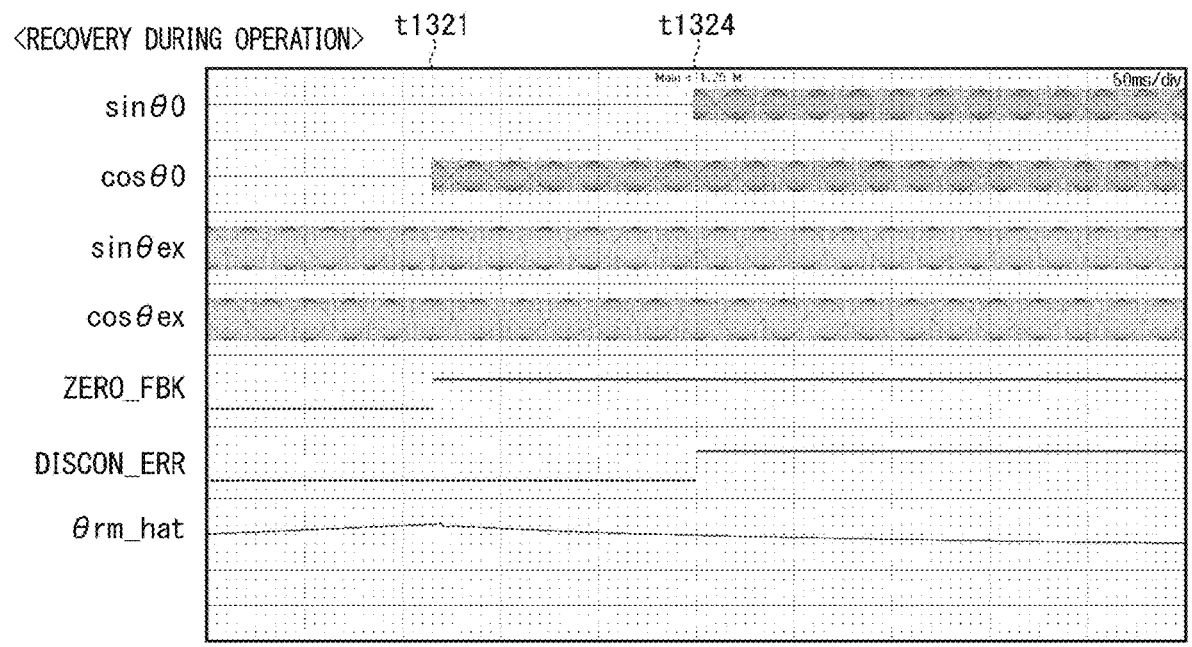
FIG. 13B is a diagram for describing an operation in a case where disconnection of two phases of an output signal has been recovered from during operation.

FIG. 13B is a diagram for describing an operation in a case where disconnection has been recovered during operation.

As illustrated in FIG. 13B, disconnection of the signal cos θ0 is recovered at a time t1321, and the resolver signal processing unit 200 causes the signal ZERO_FBK to be level H after that time.

Disconnection of the signal sin θ0 is recovered at a time t1324, and the resolver signal processing unit 200 represents that disconnection has been recovered by causing the signal DISCON_ERR to be level H after that time. In this stage, the accuracy of the mechanical angle phase estimate θrm_hat becomes a level that can guarantee desired accuracy.

Figure 13C:
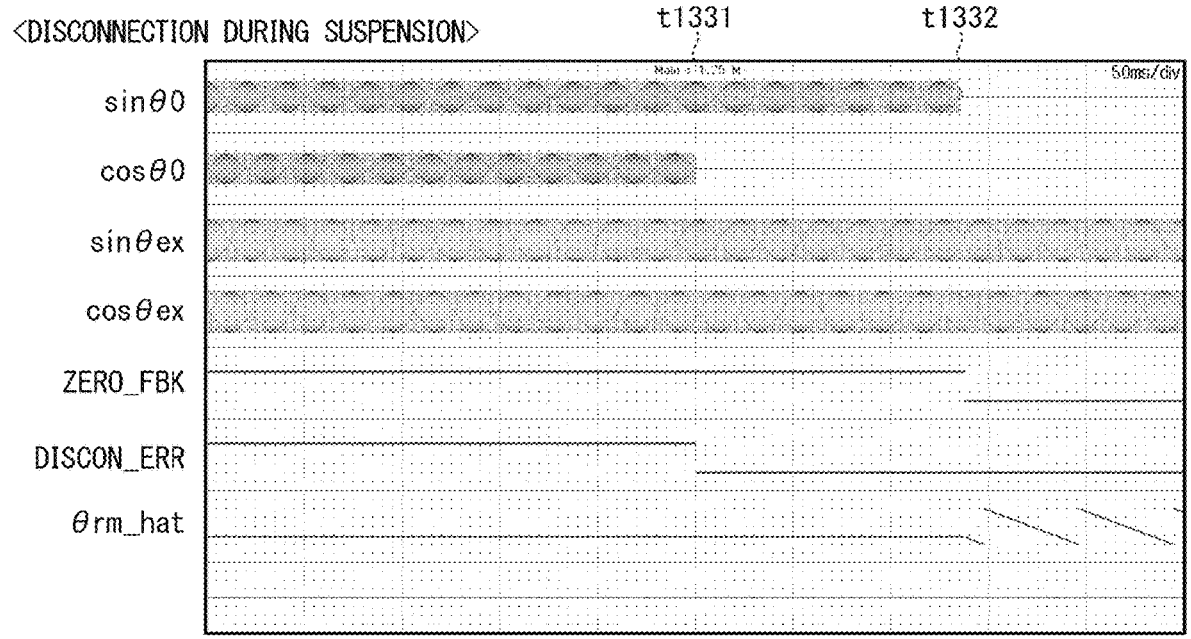
FIG. 13C is a diagram for describing an operation in a case where disconnection has occurred in two phases of an output signal during suspension.

FIG. 13C is a diagram for describing an operation in a case where disconnection has occurred during suspension.

As illustrated in FIG. 13C, disconnection occurs in the signal cos θ at a time t1331, and periodic change in the signal cos θ disappears and the amplitude thereof becomes 0 after that time. In response to this, the resolver signal processing unit 200 represents that disconnection has been detected by causing the signal DISCON_ERR to be level L. Disconnection also occurs in the signal sin θ0 at a time t1332. Accordingly, the output signal from the resolver 2 is not supplied to the resolver signal processing unit 200. The resolver signal processing unit 200 continuously supplies the signals sin θex and cos θex to the resolver 2 even after that time. The resolver signal processing unit 200 represents that a two-phase output signal cannot be detected by causing the signal ZERO_FBK to be level L because the output signal from the resolver 2 is not supplied.

When disconnection of the aforementioned condition occurs, the resolver signal processing unit 200 outputs the mechanical angle phase estimate θrm_hat but the value thereof is inaccurate. This state can be identified from the signal DISCON_ERR at level L.

Figure 13D:
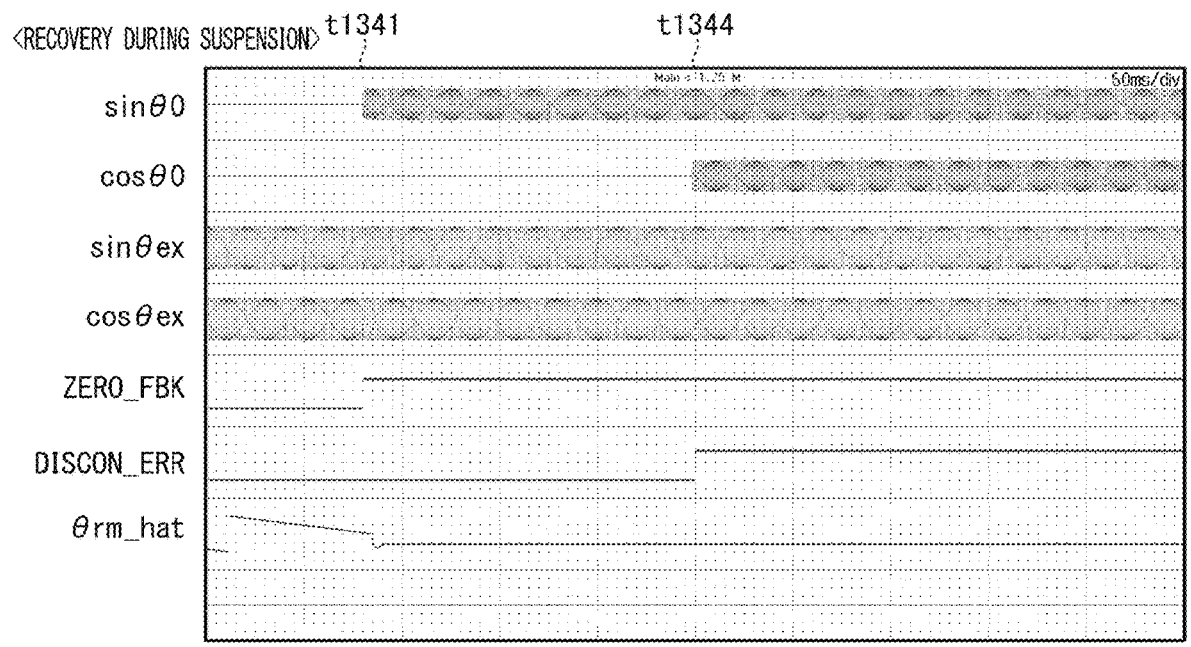
FIG. 13D is a diagram for describing an operation in a case where disconnection of two phases of an output signal has been recovered from during suspension.

FIG. 13D is a diagram for describing an operation in a case where disconnection has been recovered during suspension.

As illustrated in FIG. 13D, disconnection of the signal sin θ0 is recovered at a time t1341, and the resolver signal processing unit 200 causes the signal ZERO_FBK to be level K after that time.

Disconnection of the signal cos θ0 is recovered at a time t1344, and the resolver signal processing unit 200 represents that disconnection has been recovered by causing the signal DISCON_ERR to be level H after that time. In this stage, the accuracy of the mechanical angle phase estimate θrm_hat becomes a level that can guarantee desired accuracy.

As described above, in a case where disconnection has occurred in at least one signal, the resolver signal processing unit 200 can certainly detect occurrence of the disconnection. Further, the resolver signal processing unit 200 can control the resolver 2 and the peripheral circuit thereof without applying load thereon by detecting that a two-phase signal from the resolver 2 cannot be received and controlling the excitation signal of the resolver 2.

According to at least one of the above-described embodiments, the resolver signal processing device 100 includes the output signal state detection unit 2121 and the disconnection identification unit 2126. The output signal state detection unit 2121 calculates the sum of squares of the signal with phase A and the signal with phase B which are output signals of the two-phase output type resolver 2 on the basis of the output signals. The disconnection identification unit 2126 outputs information representing a disconnection state of any of the first signal system which supplies the excitation signal of the resolver 2 and the second signal system of the output signals on the basis of the size of a variation range in which the sum of squares periodically changes. Accordingly, the resolver signal processing device 100 can detect a disconnection state of any of the first signal system which supplies an excitation signal to a two-phase output type resolver and the second signal system which receives an output signal from the resolver.

The deviation calculation unit 201 of this resolver signal processing device 100 may acquire a signal with phase A which has been amplitude-modulated with sin θ0 and a signal with phase B which has been amplitude-modulated with cos θ0 as signals output by the resolver 2 in response to the excitation signal and calculate the aforementioned deviation.

As described above, it is possible to accurately detect occurrence of disconnection in connection between the resolver 2 and the resolver signal processing device 100 by using the resolver signal processing device 100 to detect the phase and speed of the resolver 2.

The resolver signal processing device 100 detects occurrence of disconnection by detecting vibration of the resolver FBK. In a case where the aforementioned disconnection has occurred, the resolver signal processing device 100 can prioritize continuation of operation even if phase detection accuracy decreases by distinguishing all disconnections including a disconnection pattern that can allow continuation of operation from disconnection that certainly causes continuation of operation to be impossible. In the case of disconnection that causes continuation of operation to be impossible, the resolver signal processing device 100 can prevent overheating of the resolver 2 and each transformer by generating an excitation signal on the basis of the reference frequency of the excitation signal such that the excitation signal does not deviate from standards.

Modified Examples

The above-described embodiment may be applied to a one-phase excitation two-phase output type resolver. If a behavior when one of two-phase output signals of the one-phase excitation two-phase output type resolver is the same as that of the above-described two-phase excitation two-phase output resolver, the same method can be applied.

Some or all functional units of the resolver signal processing unit 200 of the above-described embodiments may be, for example, software functional units realized by executing a program (a computer program or a software component) stored in a storage unit (a memory or the like) of a computer through a processor (a hardware processor) of a computer. Further, some or all functional units of a controller 30 may be realized by, for example, hardware such as a large scale integration (LSI) circuit, an application specific integrated circuit (ASIC) or a field-programmable gate array (FPGA), or may be realized by software functional units and hardware in combination.

Although some embodiments have been described above, configurations of the embodiments are not limited to the above examples. For example, the configurations of the embodiments may be combined and implemented.

Although several embodiments of the present invention have been described, these embodiments have been suggested as examples and are not intended to limit the scope of the invention. These embodiments can be implemented in other various forms and various omissions, substitutions and modifications are possible without departing from essential characteristics of the invention. These embodiments and modifications thereof are included in the scope and essential characteristics of the invention and also included in the invention disclosed in claims and the equivalents thereof.

For example, the resolver of the embodiments is not limited to the two-phase excitation two-phase output type and a part of the resolver signal processing device 100 may be modified and applied to a one-phase excitation two-phase output type resolver.

REFERENCE SIGNS LIST

1 Drive apparatus
2 Resolver
3 Motor
4 Inverter
100 Resolver signal processing device
101A, 101B Output buffer circuit
102A, 102B DA converter
103A, 103B Transformer
104A, 104B Input buffer circuit
105A, 105B AD converter
106A, 106B Transformer
200 Resolver signal processing unit
201 Deviation calculation unit
202A, 202B Multiplier
203 Subtractor
204 PI controller (PI operation unit)
205 Limiter 206 Integrator (integration operation unit)
207 Conversion processing unit
208 Conversion processing unit
209 Subtractor
210 Reference signal generation unit
211 Adder
215 Excitation phase estimate generation unit

The invention claimed is:

1. A resolver signal processing device comprising:
an output signal state detection unit configured to calculate a sum of squares of a signal with phase A and a signal with phase B which are output signals output from a two-phase output type resolver on the basis of the output signals;
a disconnection identification unit configured to determine that disconnection is likely to occur in any of a first signal system which supplies an excitation signal of the resolver and a second signal system of the output signals in a case that a value of the sum of squares changes and the value of the sum of squares periodically exceeds a threshold value and to output information representing the disconnection state in response to a result of the determination; and
a mode identification unit configured to identify a first mode in which the resolver is continuously used in a case that the disconnection state is detected, and a second mode in which use of the resolver is stopped in a case that the disconnection state is detected on the basis of the output signals.

2. The resolver signal processing device according to claim 1, further comprising a comparator configured to compare the value of the sum of squares with a predetermined threshold value,
wherein the disconnection identification unit outputs information representing the disconnection state in response to a result of the determination based on a result of the comparison.

3. The resolver signal processing device according to claim 1, further comprising:
a reference signal generation unit configured to generate a reference phase θref;
an operation processing unit configured to generate an excitation phase θex on the basis of the output signals and the reference phase θref;
a switch configured to select any of the excitation phase θex and the reference phase θref on the basis of a result of identification performed by the mode identification unit; and
a conversion processing unit configured to generate the excitation signal of the resolver on the basis of the selected signal.

4. A drive apparatus comprising:
a motor;
the resolver configured to detect rotation of the motor;
the resolver signal processing device according to claim 1, the resolver signal processing device being configured to generate an estimate of a phase of the motor on the basis of the rotation of the motor detected by the resolver; and
an inverter configured to drive the motor on the basis of the estimate of the phase of the motor generated by the resolver signal processing device.

5. The resolver signal processing device according to claim 3, wherein the switch outputs the excitation phase θex on the basis of control of the mode identification unit in a case that the mode identification unit identifies the first mode.

6. The resolver signal processing device according to claim 3, wherein the switch outputs the reference phase θref on the basis of control of the mode identification unit in a case that the mode identification unit identifies the second mode.

7. A resolver signal processing method, using a resolver signal processing device, comprising:
calculating a sum of squares of a signal with phase A and a signal with phase B which are output signals output from a two-phase output type resolver on the basis of the output signals;
determining that disconnection is likely to occur in any of a first signal system which supplies an excitation signal of the resolver and a second signal system of the output signals in a case where a value of the sum of squares changes and the value of the sum of squares periodically exceeds a threshold value and outputting information representing the disconnection state in response to a result of the determination; and
identifying a first mode in which the resolver is continuously used in a case that the disconnection state is detected, and a second mode in which use of the resolver is stopped in a case that the disconnection state is detected on the basis of the output signals.

* * * * *